United States Patent
Ahn et al.

(10) Patent No.: US 11,673,692 B2
(45) Date of Patent: Jun. 13, 2023

(54) FORMING TOOL AND METHODS FOR FORMING A CURVATURE INTO A COMPOSITE STIFFENER

(71) Applicant: The Boeing Company, Chicago, IL (US)

(72) Inventors: Jonathan Y. Ahn, Seattle, WA (US); Davis Tran, Seattle, WA (US); Long Ly, Renton, WA (US)

(73) Assignee: The Boeing Company, Chicago, IL (US)

( * ) Notice: Subject to any disclaimer, the term of this patent is extended or adjusted under 35 U.S.C. 154(b) by 346 days.

(21) Appl. No.: 16/713,902

(22) Filed: Dec. 13, 2019

(65) Prior Publication Data

US 2021/0179292 A1   Jun. 17, 2021

(51) Int. Cl.
| | | |
|---|---|---|
| *B64F 5/10* | (2017.01) | |
| *B29C 33/30* | (2006.01) | |
| *B29C 43/10* | (2006.01) | |
| *B29C 70/44* | (2006.01) | |
| *B29C 43/32* | (2006.01) | |
| *B29C 43/36* | (2006.01) | |
| *B29L 31/30* | (2006.01) | |

(52) U.S. Cl.
CPC .............. *B64F 5/10* (2017.01); *B29C 33/302* (2013.01); *B29C 43/10* (2013.01); *B29C 70/44* (2013.01); *B29C 2043/3222* (2013.01); *B29C 2043/3618* (2013.01); *B29L 2031/3085* (2013.01)

(58) Field of Classification Search
None
See application file for complete search history.

(56) References Cited

U.S. PATENT DOCUMENTS

| | | | | |
|---|---|---|---|---|
| 4,720,255 A | * | 1/1988 | Mittelstadt | B29C 70/20 425/446 |
| 2016/0375631 A1 | * | 12/2016 | Encinosa | B29C 65/48 156/538 |
| 2019/0210304 A1 | * | 7/2019 | Wallace | B29B 11/16 |

FOREIGN PATENT DOCUMENTS

WO    2019030882 A1    2/2019

OTHER PUBLICATIONS

Extended European Search Report dated May 4, 2021 regarding EP Application No. 20213394.8; 9 pages.
European Patent Office Communication, dated Apr. 11, 2023, regarding Application No. EP20213394.8, 7 pages.

* cited by examiner

*Primary Examiner* — Timothy Kennedy
*Assistant Examiner* — Olukorede Esan
(74) *Attorney, Agent, or Firm* — Yee & Associates, P.C.

(57) ABSTRACT

Methods of forming a curvature into a composite stiffener and a forming tool are presented. The composite stiffener is positioned in a forming region created by a base assembly and an upper assembly. A first airflow is applied through the material of the base assembly. A second airflow is applied through the material of the upper assembly. A plurality of brackets of the upper assembly is moved relative to each other to change a curvature of the forming region along a length of the forming region to form the curvature into the composite stiffener.

20 Claims, 16 Drawing Sheets

FORMING TOOL AND METHODS FOR FORMING A CURVATURE INTO A COMPOSITE STIFFENER

BACKGROUND INFORMATION

1. Field

The present disclosure relates generally to shaping a composite component and more specifically to forming a curvature into a longitudinal composite structure.

2. Background

Composite stringers, also referred to as composite stiffeners, follow a curvature of a composite skin. A composite stringer may be laid up having the desired curvature. However, laying up a composite stringer having a curvature may take an undesirable amount of time. Further, laying up a composite stringer having a curvature may take an undesirable amount of resources.

A curvature may be placed into a composite stringer by bending and twisting the uncured stringer. In conventional processes, bending the stringer up and down causes compression buildups in the material. The compression buildups can cause a collection of excess material. When composite material is compressed, the likelihood of wrinkles forming increases due to the collection of excess material.

In addition, conventional bending approaches use a series of manual levers to perform successive adjustments. The use of conventional processes and the series of manual levers does not provide consistent compliance and causes stress concentrations on the stringer. Some conventional approaches have been unable to effectively bend and twist about the longitudinal axis of the stringer, which is required to match the composite skin.

Therefore, it would be desirable to have a method and apparatus that takes into account at least some of the issues discussed above, as well as other possible issues.

SUMMARY

An embodiment of the present disclosure provides a forming tool. The forming tool comprises a base assembly, an upper assembly, and actuators. The base assembly is formed by a plurality of segments and a material for distributing a first airflow to a forming region created by the base assembly and an upper assembly, the first airflow providing an air bearing or a holding force. The upper assembly comprises a plurality of brackets and material for distributing a second airflow to the forming region in an opposite direction to the first airflow. The actuators are connected to the plurality of brackets and the plurality of segments, the actuators are configured to move each of the plurality of segments relative to each other to change a curvature of the forming region along a length of the forming region.

Another embodiment of the present disclosure provides a method of forming a curvature into a composite stiffener. The composite stiffener is positioned over a segment of a base assembly. A pair of brackets of an upper assembly over the composite stiffener to form a forming region having a cross-section. The segment and the pair of brackets are moved within a manufacturing environment while maintaining the cross-section of the forming region to form the curvature into the composite stiffener.

Another embodiment of the present disclosure provides a method of forming a curvature into a composite stiffener. The composite stiffener is positioned in a forming region created by a base assembly and an upper assembly. A first airflow is applied through the material of the base assembly. A second airflow is applied through the material of the upper assembly. The plurality of brackets is moved relative to each other to change a curvature of the forming region along a length of the forming region to form the curvature into the composite stiffener.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
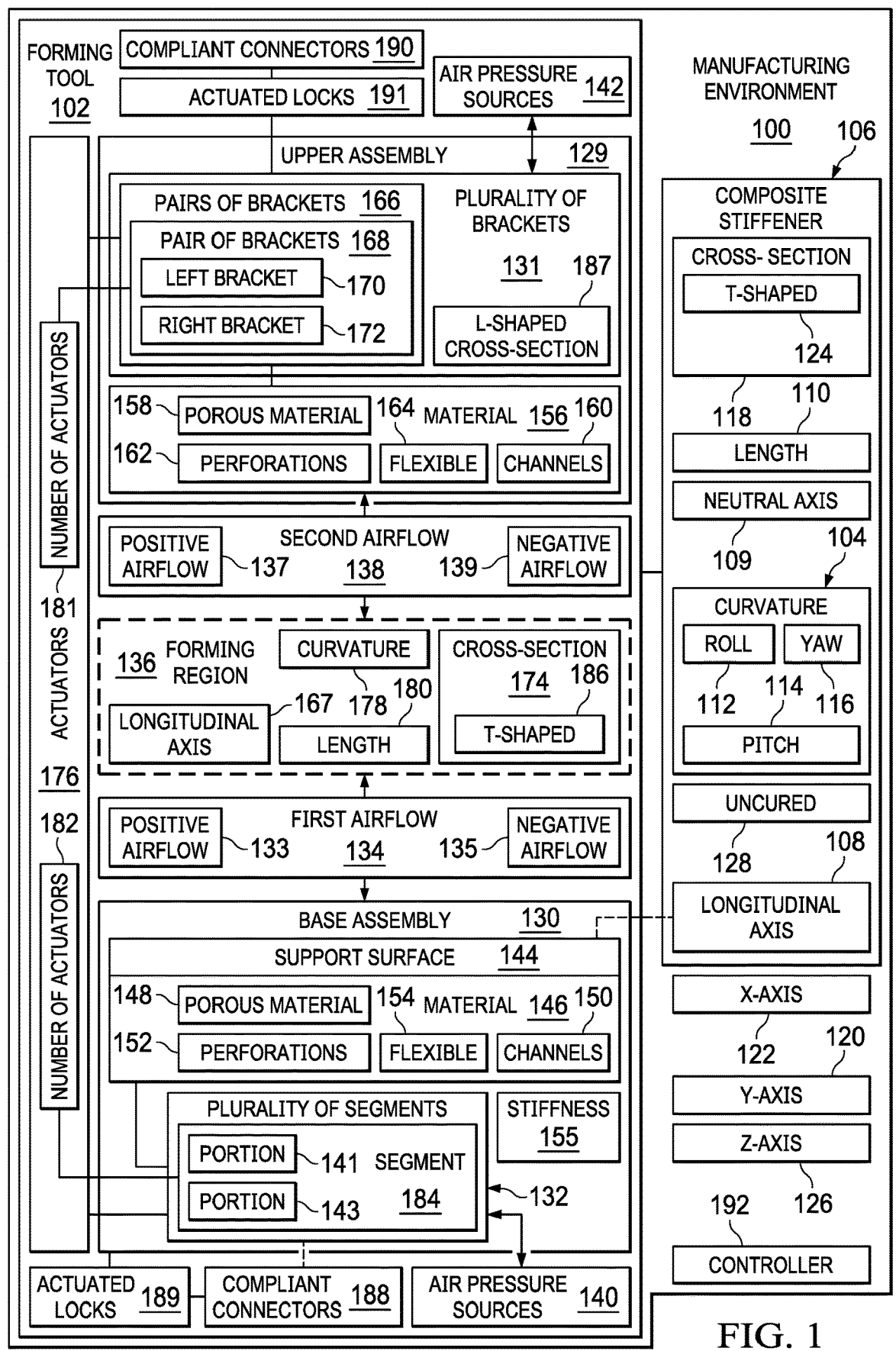
FIG. 1 is an illustration of a block diagram of a manufacturing environment in which an illustrative embodiment may be implemented.

The illustrative examples recognize and take into account one or more different considerations. The illustrative examples recognize and take into account that composite materials are tough, light-weight materials created by combining two or more functional components. For example, a composite material may include reinforcing fibers bound in polymer resin matrix. The fibers may be unidirectional or may take the form of a woven cloth or fabric. The fibers and resins are arranged and cured to form a composite material.

The illustrative examples recognize and take into account that currently composite stringers are manually twisted and bent to match the surface contour of the wing skin. However, the illustrative examples recognize and take into account that current tooling and methods struggle with consistency and accuracy.

Conventional manual adjustment mechanical-assist end-effectors exist. However, the illustrative examples recognize and take into account that attempting to bend/twist a composite stringer on the conventional end-effector while suspended in mid-air limits the ability to validate the stringer before it is transported to the composite skin. The illustrative examples recognize and take into account that conventional end-effectors provide limited stringer inspection. Limited stringer inspection can lead to not detecting out of tolerance inconsistencies in the formed stringer. A formed stringer with out of tolerance inconsistencies would introduce out of tolerance inconsistencies to a composite panel having the stringer.

The illustrative examples recognize and take into account that building an end-effector with all the desired degrees of freedom drastically increases the weight of the end-effector. Increasing the weight of the end effector drives up the payload requirement of the equipment to support the end-effector. Increasing the payload requirement also drives up floor space requirements. For example, an end effector with all the desired degrees of freedom may have hundreds of actuators, each with additional drivetrains and mechanical supports; increasing weight capacity. For example, 6 actuators at every 1-ft for a 70-ft stringer would be 420 actuators, all of having additional drivetrains and mechanical supports; increasing weight capacity. Having all of the actuation for forming a three-dimensional curvature into a composite stringer built onto the mid-air end-effector may require large gantries for movement and may be undesirably heavy.

The illustrative examples also recognize and take into account that vacuums are traditionally used to handle composite parts. The illustrative examples use a combination of outward airflow and vacuum to manipulate the composite stiffener.

The forming tool and methods of the illustrative examples separate the actuators used to do the bending and twisting of a composite stiffener from a pick and place equipment. Separating the curvature forming section from the pick and place equipment leaves most of the weight on the ground. In the illustrative examples, the stringer is only lifted once it has been bent/twisted. The illustrative examples therefore allow the composite stringer to be inspected on the ground, and once validated, the composite stringer will be picked up and sent to be installed to the desired location.

The forming tool and methods of the illustrative examples provide the ability to handle the composite stringer in full-tension during the bending. The design approach of the forming tool and methods of the illustrative examples shifts the longitudinal axis so that the part is kept under tension by moving the longitudinal axis down to where the base assembly meets the composite stringer. In the illustrative examples, the base assembly takes on the bulk of the compression, while the composite stringer part is held in tension.

Turning now to the figures, FIG. 1 is an illustration of a block diagram of a manufacturing environment in which an illustrative embodiment may be implemented. Manufacturing environment 100 includes forming tool 102 configured to form curvature 104 into composite stiffener 106. Forming tool 102 is configured to form curvature 104 relative to longitudinal axis 108 of composite stiffener 106. In some illustrative examples, longitudinal axis 108 is referred to as a centerline. Curvature 104 is formed into composite stiffener 106 along length 110 of composite stiffener 106.

Composite stiffener 106 has any desirable thickness. Composite stiffener 106 is formed of a plurality of plies. In some illustrative examples, each ply has a thickness of less than 0.01 inches. In some illustrative examples, each ply has a thickness of approximately 0.0075 inches. In some illustrative examples, composite stiffener 106 has between 8 and 80 plies. In some illustrative examples, the thickness of composite stiffener 106 varies within cross-section 118. In some illustrative examples, flanges of composite stiffener 106 have up to 40 plies. In some illustrative examples, a web of composite stiffener 106 has up to 80 plies.

In some illustrative examples, longitudinal axis 108 is a desired axis set by base assembly 130. In these illustrative examples, longitudinal axis 108 has a different position than neutral axis 109 of composite stiffener 106. In some illustrative examples, longitudinal axis 108 is a desired axis positioned where composite stiffener 106 contacts base assembly 130 of forming tool 102.

Curvature 104 includes at least one of roll 112, pitch 114, or yaw 116. Roll 112 is a rotation, or twisting of cross-section 118 about longitudinal axis 108. Roll 112 is a movement of cross-section 118 about longitudinal axis 108 along length 110 of composite stiffener 106. Change in roll 112 may be described as a twist.

Pitch 114 is movement of longitudinal axis 108 in y-axis 120 of manufacturing environment 100. Pitch 114 may be described as movement up or down relative to cross-section 118. Change in pitch 114 may be described as a hill or a dip.

Yaw 116 is movement of longitudinal axis 108 in x-axis 122 of manufacturing environment 100. Yaw 116 may be described as movement left or right relative to cross-section 118. Change in yaw 116 may be described as a bend.

Composite stiffener 106 has any desirable cross-section 118. In some illustrative examples, composite stiffener 106 has T-shaped 124 cross-section 118. In some illustrative examples, longitudinal axis 108 is positioned within a base of T-shaped 124 cross-section 118. When cross-section 118 is T-shaped 124, composite stiffener 106 may be called a "blade stringer."

In some illustrative examples, composite stiffener 106 may also be called a longitudinal composite structure.

Length 110 is substantially greater than the height or width of cross-section 118. Prior to forming, longitudinal axis 108 extends along z-axis 126.

Curvature 104 is formed into composite stiffener 106 when composite stiffener 106 is uncured 128. Composite stiffener 106 is cured after forming curvature 104 into composite stiffener 106.

Forming tool 102 comprises base assembly 130, upper assembly 129, and actuators 176. Base assembly 130 is formed by plurality of segments 132 and material 146 for distributing first airflow 134 to forming region 136 created by base assembly 130 and upper assembly 129, first airflow 134 providing an air bearing or a holding force. Base assembly 130 is configured to provide first airflow 134 to forming region 136 created by base assembly 130 and upper assembly 129. First airflow 134 provides an air bearing or a holding force to composite stiffener 106 within forming region 136. Base assembly 130 is formed by plurality of segments 132 and material 146 for distributing first airflow 134.

Upper assembly 129 is configured to provide second airflow 138 to forming region 136 in an opposite direction to first airflow 134. Upper assembly 129 comprises plurality of brackets 131 and material 156 for distributing second airflow 138 to forming region 136 in an opposite direction to first airflow 134.

Actuators 176 are connected to plurality of brackets 131 and plurality of segments 132. Actuators 176 are configured to move each of plurality of segments 132 relative to each other to change curvature 178 of forming region 136 along length 180 of forming region 136.

Material 146 is configured to provide first airflow 134 to forming region 136 created by base assembly 130 and upper assembly 129. Material 156 is configured to provide second airflow 138 to forming region 136.

In some illustrative examples, plurality of segments 132 is formed of material 146. In some illustrative examples, material 146 is a separate layer connected to each of plurality of segments 132. In some of these illustrative examples, material 146 is a number of sheets connecting plurality of segments 132. In one illustrative example, a single sheet of material 146 connects each of plurality of segments 132. In some illustrative examples, material 146 includes more than one sheet, at least one sheet attached to more than one segment of plurality of segments 132. In some illustrative examples, material 146 includes a plurality of sheets, each sheet connected to a single segment of plurality of segments 132.

First airflow 134 is a movement of air through material 146. In some illustrative examples, first airflow 134 is the same direction through all of material 146 associated with plurality of segments 132. In some illustrative examples, first airflow 134 is positive airflow 133. Positive airflow 133 through material 146 applies a positive pressure into forming region 136. With positive airflow 133, air flows through material 146 and into forming region 136. When present, positive airflow 133 allows for composite stiffener 106 to slip relative to base assembly 130.

In some illustrative examples, first airflow 134 is negative airflow 135. Negative airflow 135 through material 146 pulls air from forming region 136. With negative airflow 135, air flows from forming region 136 through material 146. Negative airflow 135 may also be referred to as "drawing a vacuum" or pulling a partial vacuum.

In some illustrative examples, first airflow 134 includes two different directions. In these illustrative examples, at least a portion of material 146 has positive airflow 133 into forming region 136 and at least one portion of material 146 has a negative airflow 135 pulling air from forming region 136. In some illustrative examples, positive airflow 133 is present through material 146 at a first location along length 180 of forming region 136 and negative airflow 135 is present through material 146 at a second location along length 180 of forming region 136. In some illustrative examples, positive airflow 133 is present through material 146 associated with at least one segment of plurality of segments 132 and negative airflow 135 is present through material 146 associated with another segment of plurality of segments 132.

In some illustrative examples, positive airflow 133 and negative airflow 135 are provided at a same location along length 180 of forming region 136. In some illustrative examples, positive airflow 133 is present through a portion of material 146 associated with one of a left bracket or a right bracket and negative airflow 135 is present through a portion of material 146 associated with the other of the left bracket or the right bracket. In some illustrative examples, positive airflow 133 is present through a portion of material 146 associated with one of left bracket 170 or right bracket 172 and negative airflow 135 is present through a portion of material 146 associated with the other of left bracket 170 or right bracket 172.

In some illustrative examples, positive airflow 133 and negative airflow 135 are provided in one segment of plurality of segments 132. In one illustrative example, positive airflow 133 is provided in a part of segment 184 and negative airflow 135 is provided in the remainder of segment 184. In one illustrative example, positive airflow 133 is provided in portion 141 of segment 184 associated with left bracket 170 and negative airflow 135 is provided in portion 143 of segment 184 associated with right bracket 172. In one illustrative example, negative airflow 135 is provided in portion 141 of segment 184 associated with left bracket 170 and positive airflow 133 is provided in portion 143 of segment 184 associated with right bracket 172.

In some illustrative examples, first airflow 134 comprises more than one intensity of airflow. In one illustrative example, first airflow 134 comprises more than one intensity of positive airflow 133. In one illustrative example, first airflow 134 comprises more than one intensity of negative airflow 135.

In some illustrative examples, first airflow 134 through segment 184 comprises more than one intensity of airflow. In some illustrative examples, first airflow 134 through segment 184 comprises more than one intensity of positive airflow 133. In some illustrative examples, first airflow 134 through segment 184 comprises more than one intensity of negative airflow 135.

Second airflow 138 is a movement of air through material 156. In some illustrative examples, second airflow 138 is the same direction through all of material 156. In some illustrative examples, second airflow 138 is positive airflow 137. Positive airflow 137 through material 156 applies a positive pressure into forming region 136. With positive airflow 137, air flows through plurality of brackets 131 and into forming region 136. When present, positive airflow 137 allows for composite stiffener 106 to slip relative to upper assembly 129.

In some illustrative examples, second airflow 138 is negative airflow 139. Negative airflow 139 through material 156 pulls air from forming region 136. With negative airflow 139, air flows from forming region 136 through material 156.

In some illustrative examples, second airflow 138 includes two different directions. In these illustrative examples, at least a portion of material 156 has positive airflow 137 into forming region 136 and at least a portion of material 156 has negative airflow 139 pulling air from forming region 136. In some illustrative examples, positive airflow 137 is present through material 156 associated with one pair of brackets of plurality of brackets 131 and negative airflow 139 is present through material 156 associated with another pair of brackets of plurality of brackets 131.

In some illustrative examples, positive airflow 137 and negative airflow 139 are provided at a same location along length 180 of forming region 136. In some illustrative examples, positive airflow 137 is present through a portion of material 156 associated with one of a left bracket or a right bracket and negative airflow 139 is present through a portion of material 156 associated with the other of the left bracket or the right bracket. In some illustrative examples, positive airflow 137 is present through a portion of material 156 associated with one of left bracket 170 or right bracket 172 and negative airflow 139 is present through a portion of material 156 associated with the other of left bracket 170 or right bracket 172.

In some illustrative examples, positive airflow 137 and negative airflow 139 are provided in material 156 associated with one pair of pairs of brackets 166. In one illustrative example, positive airflow 137 is provided in a one bracket of pair of brackets 168 and negative airflow 139 is provided in the other bracket of bracket of pair of brackets 168. In one illustrative example, positive airflow 137 is provided in material 156 associated with left bracket 170 and negative airflow 139 is provided in material 156 associated with right bracket 172. In one illustrative example, negative airflow 139 is provided in material 156 associated with left bracket 170 and positive airflow 137 is provided in material 156 associated with right bracket 172.

In some illustrative examples, second airflow 138 comprises more than one intensity of airflow. In one illustrative example, second airflow 138 comprises more than one intensity of positive airflow 137. In one illustrative example, second airflow 138 comprises more than one intensity of negative airflow 139.

In some illustrative examples, second airflow 138 through pair of brackets 168 comprises more than one intensity of airflow. In some illustrative examples, second airflow 138 through pair of brackets 168 comprises more than one intensity of positive airflow 137. In one illustrative example, one of left bracket 170 or right bracket 172 has a greater intensity of positive airflow 137 than the other of left bracket 170 or right bracket 172. In some illustrative examples, second airflow 138 through pair of brackets 168 comprises more than one intensity of negative airflow 139. In one illustrative example, one of left bracket 170 or right bracket 172 has a greater intensity of negative airflow 139 than the other of left bracket 170 or right bracket 172.

Air pressure sources 140 are pneumatically connected to base assembly 130 to provide first airflow 134 through material 146. Air pressure sources 140 are pneumatically connected to at least one of material 146 or plurality of segments 132 of base assembly 130 to provide first airflow 134 through material 146. Air pressure sources 140 are configured to apply first airflow 134 through material 146. In some illustrative examples, each of air pressure sources 140 are individually controllable to control air pressure to portions of material 146 associated with each segment of plurality of segments 132. In some illustrative examples, each of air pressure sources 140 is reversible to change between positive airflow 133 and negative airflow 135.

Air pressure sources 142 are pneumatically connected to upper assembly 129 to provide second airflow 138 through material 156. Air pressure sources 142 are pneumatically connected to at least one of material 156 or plurality of brackets 131 of upper assembly 129 to provide second airflow 138 through material 156. Air pressure sources 142 are configured to apply second airflow 138 through material 156. In some illustrative examples, each of air pressure sources 142 are individually controllable to control air pressure to material 156 associated with each segment of plurality of brackets 131. In some illustrative examples, each of air pressure sources 142 is reversible to change between positive airflow 137 and negative airflow 139.

First airflow 134 is distributed across surface 144 of base assembly 130 through any desirable method. In some illustrative examples, material 146 of base assembly 130 is porous material 148. When material 146 takes the form of porous material 148, pores in porous material 148 distribute first airflow 134 from air pressure sources 140 through material 146. In other illustrative examples, at least one of channels 150 or perforations 152 cut into material 146 distribute first airflow 134 from air pressure sources 140. In some of these illustrative examples, material 146 acts a manifold to distribute first airflow 134. In some illustrative examples, material 146 is flexible 154.

Material 146 is selected to be contact approved with a composite material. For example, material 146 is selected to be non-reactive to a composite material, not pull resin from a composite material, and not bind to the composite material. Material 146 is selected such that foreign object debris (FOD) is not generated by carbon fiber composite material when using base assembly 130.

To form curvature 104, plurality of segments 132 are moved to emulate a desired location for composite stiffener 106. For example, when composite stiffener 106 is configured be connected to a wing panel, plurality of segments 132 are moved to emulate the curvature of the location of wing panel to which composite stiffener 106 will be attached. Synchronized movement of plurality of brackets 131 and plurality of segments 132 is used to form curvature 104 into composite stiffener 106. The movement of plurality of brackets 131 and plurality of segments 132 is a slow, progressive movement.

Plurality of segments 132 have any desirable size. In some illustrative examples, each segment of plurality of segments 132 has a length of 12 inches or less in the direction of length 110 of composite stiffener 106, also referred to as a longitudinal direction. In some illustrative examples, each segment of plurality of segments 132 has a length of between 2 and 3 inches in the direction of length 110 of composite stiffener 106.

Base assembly 130 has stiffness 155. Base assembly 130 of forming tool 102 at the base of composite stiffener 106 is designed to be of equivalent stiffness or lower stiffness than composite stiffener 106. Base assembly 130 then holds the bending and twisting about longitudinal axis 167. Longitudinal axis 167 is positioned on support surface 144 of base assembly 130. Base assembly being and twisting composite stiffener 106 about longitudinal axis 167 allows for composite stiffener 106 to be held in full-tension throughout composite stiffener 106 regardless of upward or down bending. When composite stiffener 106 is in full tension throughout, each ply of the laminate is in tension during forming so that there are no plies in compression. By maintaining full tension throughout, wrinkles are reduced or eliminated.

Stiffness 155 of base assembly 130 is controlled such that neutral axis 109 is not the axis about which composite stiffener 106 is formed. By pulling composite stiffener 106 against base assembly 130 and controlling stiffness 155 of base assembly 130 (but sliding along compliant connectors 188) longitudinal axis 108 is moved.

Second airflow 138 is distributed across plurality of brackets 131 through any desirable method. In some illustrative examples, material 156 of plurality of brackets 131 is porous material 158.

Porous material 158 comprises a solid or foam matrix having pores permeating throughout. Porous material 158 can be referred to as a porous medium. Porous material 158 is an open cell material. The pores permeate throughout porous material 158 to all sides of material 156.

Material 156 is formed of any desirable type of porous material 158. In some illustrative examples, material 156 is formed of a porous ceramic material, such as a sintering material. In some illustrative examples, material 156 comprises a porous polymeric material.

When material 156 is formed of porous material 158, pores in porous material 158 distribute second airflow 138 from air pressure sources 142 through material 156. In other illustrative examples, at least one of channels 160 or perforations 162 cut into material 156 distribute second airflow 138 from air pressure sources 142. In some of these illustrative examples, material 156 acts a manifold to distribute second airflow 138. In some illustrative examples, material 156 is flexible 164.

Material 156 is selected to be contact approved with a composite material. For example, material 156 is selected to be non-reactive to a composite material, not pull resin from a composite material, and not bind to the composite material. Material 156 is selected such that foreign object debris (FOD) is not generated by carbon fiber composite material when using upper assembly 129.

As depicted, plurality of brackets 131 comprises pairs of brackets 166. Each pair is moveable relative to longitudinal axis 167 of forming region 136. Each pair of brackets in pairs of brackets 166 is independently moveable relative to the remaining pairs of brackets in pairs of brackets 166.

For example, pair of brackets 168 includes left bracket 170 and right bracket 172. Pair of brackets 168 is independently moveable relative to the remainder of pairs of brackets 166.

Plurality of brackets 131 and plurality of segments 132 form forming region 136 with cross-section 174. Actuators 176 are connected to plurality of brackets 131 and base assembly 130 and are configured to move plurality of brackets 131 and plurality of segments 132 of base assembly 130 within manufacturing environment 100 to change curvature 178 of forming region 136 along length 180 of forming region 136. Actuators 176 are configured to move each segment independently of each other segment of plurality of segments 132. Actuators 176 are configured to move each pair of brackets independently of each other pair of brackets of pairs of brackets 166.

By moving each segment of plurality of segments 132 independently, curvature 178 is changed. By moving each pair of brackets of pairs of brackets 166 independently, curvature 178 is changed.

Synchronized movement of plurality of brackets 131 and plurality of segments 132 by actuators 176 is used to change curvature 178 of forming region 136. The movement of plurality of brackets 131 and plurality of segments 132 by actuators 176 is a slow, progressive movement.

Actuators 176 are configured to change curvature 178 of forming region 136 while maintaining cross-section 174 of forming region 136. Actuators 176 are configured to move each segment of plurality of segments 132 and a respective pair of brackets 168 together to maintain cross-section 174. Actuators 176 are configured to move each segment of plurality of segments 132 and a respective pair of brackets 168 independently of the remaining segments in plurality of segments 132 and the remaining pairs of brackets in pairs of brackets 166.

Changing curvature 178 of forming region 136 forms curvature 104 into composite stiffener 106 within forming region 136. Curvature 104 is formed into composite stiffener 106 in any desirable fashion. In some illustrative examples, curvature 178 is changed by progressively moving successive segments of plurality of segments 132. In some illustrative examples, curvature 178 is changed at a first end and is progressively changed moving along length 180 to an opposite end. In some illustrative examples, curvature 178 is changed starting from the middle of length 180 and progressively moving outward.

In some illustrative examples, synchronized movement of actuators 176 includes simultaneous movement of multiple actuators. In some illustrative examples, at least two segments of plurality of segments 132 are moved substantially simultaneously. In some illustrative examples, to gradually introduce curvature to reach curvature 104, actuators 176 are moved to increase curvature of composite stiffener 106 being formed through multiple iterations of successively increasing curvatures.

Each bracket of plurality of brackets 131 has a respective number of actuators of actuators 176 to move the respective bracket in at least 3 degrees of freedom (DOF). Each segment of plurality of segments 132 has a respective number of actuators of actuators 176 to move the respective segment in at least 3 degrees of freedom (DOF).

Actuators 176 include number of actuators 181 and number of actuators 182. Number of actuators 181 is configured to move pair of brackets 168. Number of actuators 182 is configured to move segment 184 of plurality of segments 132. By having a respective number of actuators, number of actuators 181, pair of brackets 168 is moved independently of other pairs of pairs of brackets 166. By having a respective number of actuators, number of actuators 182, segment 184 is moved independently of other segments of plurality of segments 132.

Actuators 176 take any desirable form. In some illustrative examples, actuators 176 are selected from pneumatic actuators, electric actuators, hydraulic actuators, or any other desirable type of actuator.

In some illustrative examples, cross-section 174 of forming region 136 is T-shaped 186. In some illustrative examples, plurality of brackets 131 each has L-shaped cross-section 187. Each bracket of plurality of brackets 131 having L-shaped cross-section 187 provides T-shaped 186 cross-section 174 of forming region 136.

Material 156 has any desirable features to provide second airflow 138 to forming region 136. In some illustrative examples, material 156 is formed of porous material 158 to provide second airflow 138 to forming region 136. In some illustrative examples, material 156 includes at least one of perforations 162 or channels 160 to provide second airflow 138 to forming region 136.

Material 146 has any desirable features to provide first airflow 134 to forming region 136. In some illustrative examples, material 146 of base assembly 130 is formed of porous material 148 to provide first airflow 134 to forming region 136. In some illustrative examples, material 146 of base assembly 130 includes at least one of perforations 152 or channels 150 to provide first airflow 134 to forming region 136.

In some illustrative examples, distances between plurality of segments 132 during forming of composite stiffener 106 are controlled by compliant connectors 188. Compliant connectors 188 extend through and connect plurality of segments 132. In these illustrative examples, actuated locks 189 are present and configured to selectively restrain plurality of segments 132 relative to compliant connectors 188. Actuated locks 189 take any desirable form. In some illustrative examples, actuated locks 189 are air locks.

In some illustrative examples, distances between plurality of brackets 131 during forming of composite stiffener 106 are controlled by compliant connectors 190. Compliant connectors 190 extend through and connect plurality of brackets 131. In these illustrative examples, actuated locks 191 are configured to selectively restrain plurality of brackets 131 relative to compliant connectors 190.

In some illustrative examples, a smooth continuous (or discontinuous) open-cell foam is used to form base assembly 130, such that base assembly 130 holds vacuum at a base of composite stiffener 106, while plurality of brackets 131 with L-shaped cross-section 187 applies both clamping force and outward air pressure to composite stiffener 106. The combination of vacuum holding at a bottom of composite stiffener 106 and outward second airflow 138 at the top of composite stiffener 106 creates an air bearing surface for composite stiffener 106 to be bent and twisted about the desired axis, longitudinal axis 167, which is centered at the base of cross-section 118 of composite stiffener 106. Depending on whether the bend and twist are up or downward for a given segment, the flow of vacuum and air may be reversed so that first airflow 134 and second airflow 138 are still opposite pressures. In some illustrative examples, plurality of brackets 131 remains locked in place once curvature 104 in composite stiffener 106 is achieved. In some illustrative examples, plurality of brackets 131 is then coupled to a pick and place system to be delivered to a desired location, such as a wing panel In some other illustrative examples, plurality of brackets 131 may be removed from forming tool 102, exposing composite stiffener 106 for a pick and place system to lift composite stiffener 106 without plurality of brackets 131.

Outward second airflow 138 and compression of plurality of brackets 131 having L-shaped cross-section 187, creates an air bearing surface to eliminate shear friction on composite stiffener 106 that can cause delamination and wrinkles. Outward second airflow 138 and compression of plurality of brackets 131 having L-shaped cross-section 187, allows slip of composite stiffener 106 relative to plurality of brackets 131.

Likewise, base assembly 130 supporting composite stiffener 106 has stiffness 155, designed to be of equivalent stiffness or lower stiffness than composite stiffener 106. Base assembly 130 having an equivalent stiffness or lower stiffness than composite stiffener 106 allows for composite stiffener 106 to be held in full-tension throughout regardless of upward or down bending. When composite stiffener 106 is in full tension throughout, each ply of the laminate is in tension during forming so that there are no plies in compression. By maintaining full tension throughout, wrinkles are reduced or eliminated.

Curvature 104 of composite stiffener 106 is selected based on a desired location for composite stiffener 106. In some illustrative examples, curvature 104 is specific to a desired location of a composite skin. Curvature 104 is formed based on at least one of a scan of a composite skin, a model of composite stiffener 106, or a model of the composite skin.

Controller 192 is configured to send commands to forming tool 102 to form curvature 104 into composite stiffener 106. In some illustrative examples, controller 192 sends commands to form curvature 104 based on at least one of a scan of the composite skin, a model of composite stiffener 106, or a model of the composite skin. Forming tool 102 further comprises controller 192 configured to send commands to at least one of actuators 176 to change curvature 178 of forming region 136 according to NC programming, air pressure sources 140, 142 to control at least one of first airflow 134 or the second airflow, actuated locks 189 configured to selectively restrain the plurality of segments 132 relative to compliant connectors 188, or actuated locks 191 configured to selectively restrain the plurality of brackets 131 relative to compliant connectors 190.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In one illustrative example, base assembly 130 does not have perforations 152 or channels 150. In some illustrative examples, composite stiffener 106 has a different cross-section than T-shaped 124 cross-section 118. Composite stiffener 106 has any desired shape of cross-section 118. In one illustrative example, cross-section 118 is hat-shaped.

In another illustrative example, sensors are associated with components of upper assembly 129 or components of base assembly 130. When present, sensors provide controller 192 with location data for components of forming tool 102.

Figure 2:
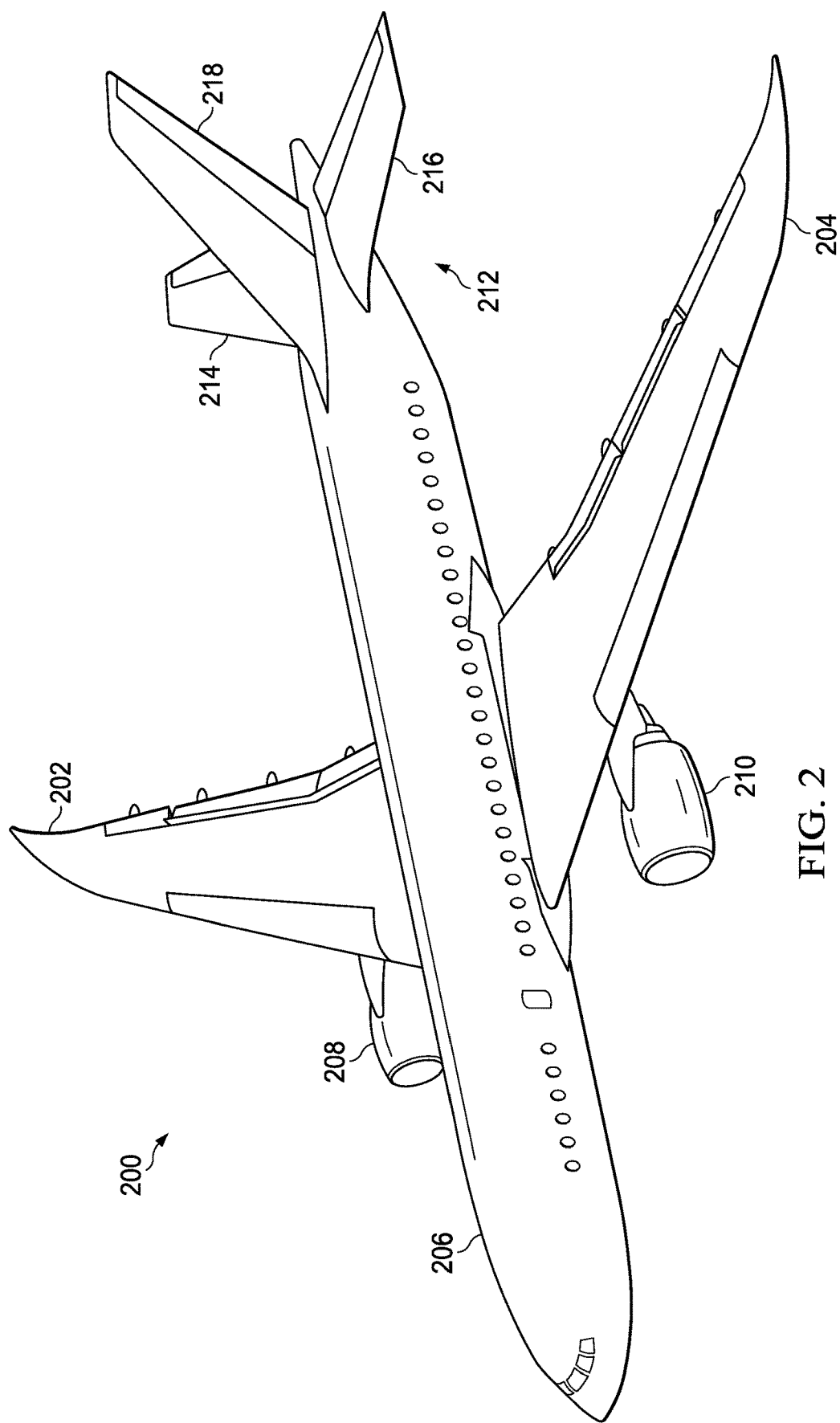
FIG. 2 is an illustration of an aircraft in accordance with an illustrative embodiment.

Turning now to FIG. 2, an illustration of an aircraft is depicted in accordance with an illustrative embodiment. Aircraft 200 is an example of an aircraft with composite stiffener 106 of FIG. 1 having curvature 104.

In this illustrative example, aircraft 200 has wing 202 and wing 204 attached to body 206. Aircraft 200 includes engine 208 attached to wing 202 and engine 210 attached to wing 204.

Body 206 has tail section 212. Horizontal stabilizer 214, horizontal stabilizer 216, and vertical stabilizer 218 are attached to tail section 212 of body 206.

Aircraft 200 is an example of an aircraft in which a composite stiffener formed using forming tool 102 may be implemented in accordance with an illustrative embodiment. Forming tool 102 of FIG. 1 can be used to form a curvature into a composite stiffener for any desirable portion of aircraft 200. In some illustrative examples, a composite stiffener formed by forming tool 102 is present in at least one of wing 202, wing 204, or body 206.

Figure 3:
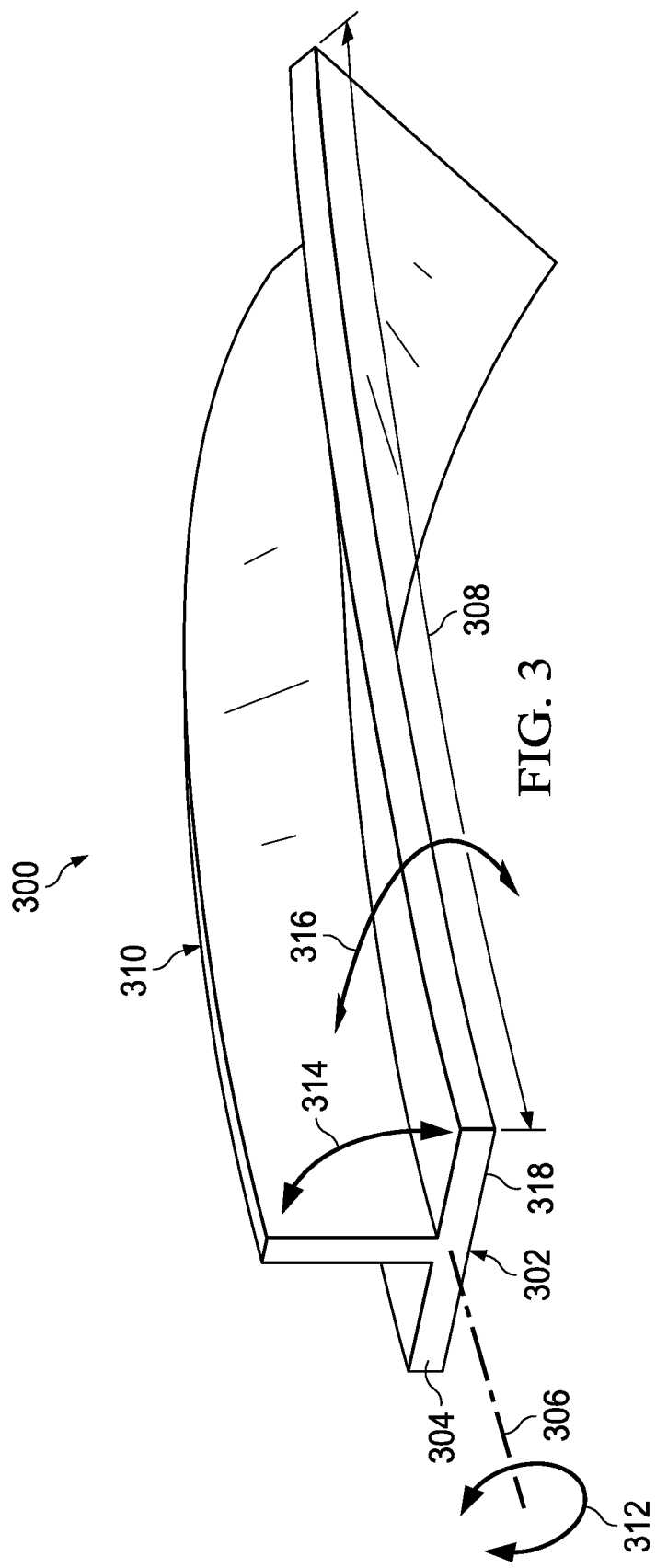
FIG. 3 is an illustration of a composite stiffener with a curvature in accordance with an illustrative embodiment.

Turning now to FIG. 3, an illustration of a composite stiffener with a curvature is depicted in accordance with an illustrative embodiment. Composite stiffener 300 is a physical implementation of composite stiffener 106 having curvature 104 formed by forming tool 102. Composite stiffener 300 has cross-section 302. As depicted, cross-section 302 is T-shaped 304. Composite stiffener 300 has longitudinal axis 306 and length 308. In some illustrative examples, longitudinal axis 306 is referred to as a centerline.

Composite stiffener 300 has curvature 310 that varies along length 308. Curvature 310 includes roll 312, pitch 314, and yaw 316. Roll 312 rotates cross-section 302 around longitudinal axis 306. Pitch 314 moves longitudinal axis 306 perpendicular to base 318 of composite stiffener 300. Yaw 316 moves longitudinal axis 306 parallel to base 318 of composite stiffener 300.

Figure 4:
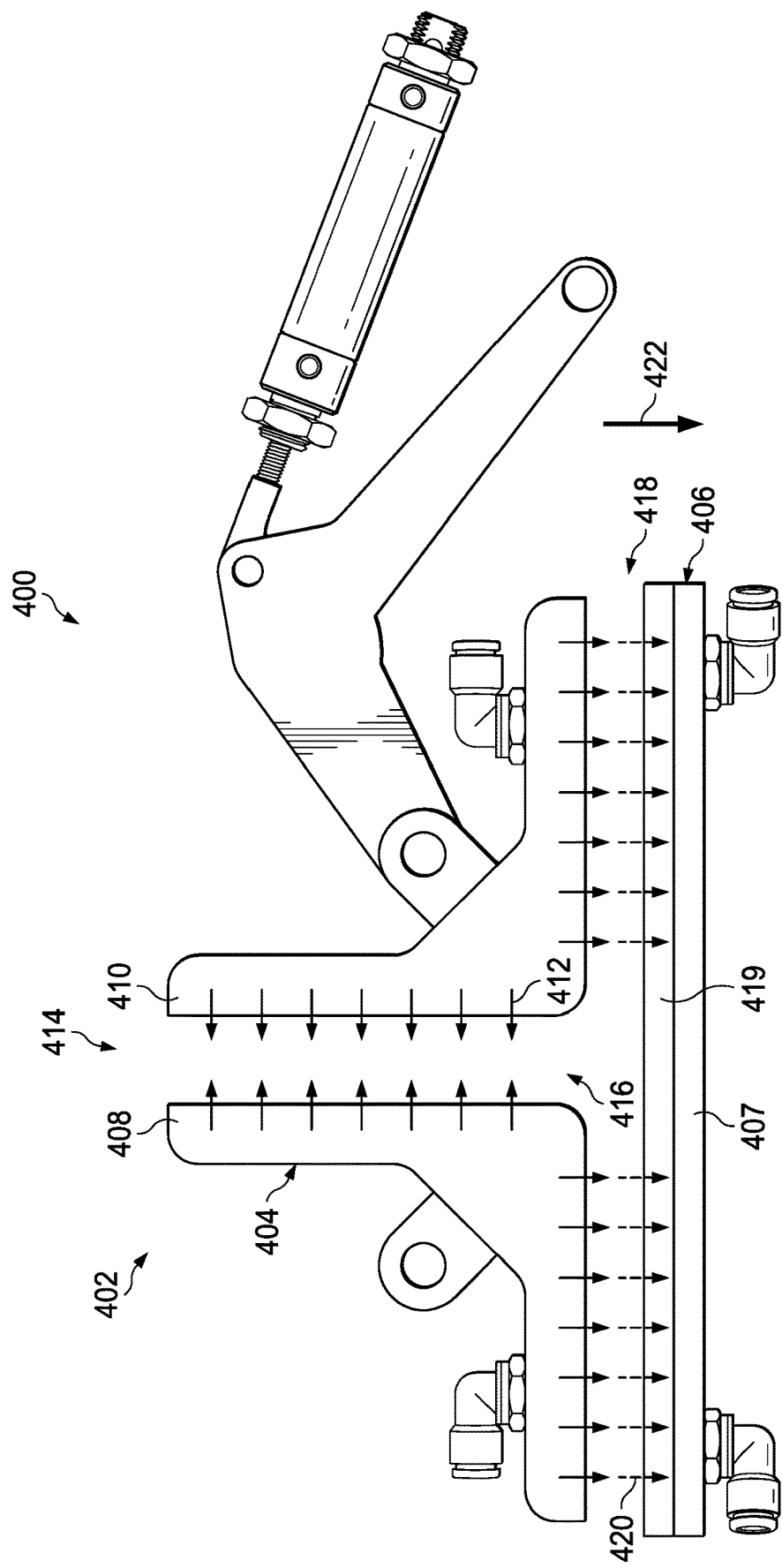
FIG. 4 is an illustration of a front view of a forming tool with indicated airflow in accordance with an illustrative embodiment.

Turning now to FIG. 4, an illustration of a front view of a forming tool with indicated airflow is depicted in accordance with an illustrative embodiment. View 400 is a view of pair of brackets 168 and segment 184 of forming tool 102 of FIG. 1. Forming tool 402 is a physical implementation of forming tool 102 of FIG. 1.

Forming tool 402 can be used to form composite stiffeners of wing 202, wing 204, body 206, or other components of aircraft 200 of FIG. 2. Forming tool 402 having pair of brackets 404 and segment 406 can be used to form curvature 310 into composite stiffener 300. Segment 406 is one of a plurality of segments of base assembly 407. Pair of brackets 404 is one of a plurality of brackets of upper assembly 409.

Pair of brackets 404 includes left bracket 408 and right bracket 410. Pair of brackets 404 provides second airflow 412 to forming region 414. Forming region 414 is formed by pair of brackets 404 and segment 406. As depicted, forming region 414 has T-shaped 416 cross-section 418. Forming region 414 has cross-section 418 that has substantially the same shape as a composite stiffener to be formed. In this illustrative example, cross-section 418 is T-shaped 416 to support T-shaped 304 of cross-section 302 of composite stiffener 300 of FIG. 3.

In this illustrative example, second airflow 412 is a positive airflow. Second airflow 412 being a positive airflow allows one face of a material in forming region 414 to slip relative to left bracket 408 and right bracket 410 to avoid wrinkling. A positive airflow will move through a component and into forming region 414. In this illustrative example, second airflow 412 through left bracket 408 and right bracket 410 is positive. In some illustrative examples, second airflow 412 is referred to as outward air pressure flow. Second airflow 412 through left bracket 408 and right bracket 410 is provided through at least one of porous material, perforations, or channels.

In some illustrative example, second airflow 412 has a different intensity in left bracket 408 and right bracket 410. In some illustrative examples, intensity of second airflow 412 is greater through left bracket 408 than through right bracket 410. In some illustrative examples, intensity of second airflow 412 is less through left bracket 408 than through right bracket 410.

Although second airflow 412 is depicted as a positive airflow through both left bracket 408 and right bracket 410, in other illustrative examples, second airflow 412 is both negative and positive. In some non-depicted examples, second airflow 412 through one of left bracket 408 and right bracket 410 is positive while second airflow 412 through the other of left bracket 408 and right bracket 410 is negative.

Although second airflow 412 is depicted as moving through each of left bracket 408 and right bracket 410, in some illustrative examples, a separate contact surface is present on left bracket 408 and right bracket 410 to distribute second airflow 412. In these illustrative examples, the separate material comprises at least one of porous material, perforations, or channels to distribute second airflow 412.

Material 419 of base assembly 407 provides first airflow 420 to forming region 414. First airflow 420 is an opposite direction to second airflow 412. First airflow 420 is a negative airflow. A negative airflow will move through a component, such as material on or forming a bracket or material on or forming a segment, from forming region 414. In this illustrative example, first airflow 420 through material 419 is negative. In some illustrative examples, providing first airflow 420 is referred to as "pulling a vacuum" or "pulling a partial vacuum". In some illustrative examples, a composite material to be shaped may be referred to as forming a vacuum chamber with base assembly 407.

In some illustrative examples, first airflow 420 has more than one intensity in material 419. In some illustrative examples, intensity of first airflow 420 is greater through a portion of material 419 associated with left bracket 408 than through a portion of material 419 associated with right bracket 410. In some illustrative examples, intensity of first airflow 420 is less through a portion of material 419 associated with left bracket 408 than through a portion of material 419 associated with right bracket 410.

Although first airflow 420 is depicted as a negative airflow through material 419, in other illustrative examples first airflow 420 is both negative and positive. In some non-depicted examples, first airflow 420 through a portion of material 419 is negative while first airflow 420 through a remainder of material 419 is positive.

In some non-depicted examples, first airflow 420 through a portion of material 419 associated with left bracket 408 is positive while first airflow 420 through a portion of material 419 associated with right bracket 410 is negative. In some non-depicted examples, first airflow 420 through a portion of material 419 associated with left bracket 408 is negative while first airflow 420 through a portion of material 419 associated with right bracket 410 is positive.

In this illustrative example, material 419 is connected to segment 406. In other illustrative examples, segment 406 is formed of material 419. In this illustrative example, material 419 is one of a porous material or perforated. In other non-depicted examples, material 419 has channels to distribute first airflow 420.

In view 400, with second airflow 412 being positive, a composite stiffener (not depicted) within forming region 414 is pushed against material 419 on segment 406. In view 400, with first airflow 420 as a negative airflow, composite stiffener (not depicted) within forming tool 402 is pulled against material 419 on segment 406. In some illustrative examples, a composite stiffener (not depicted) within forming region is formed downward 422 with second airflow 412 and first airflow 420 as in view 400. To form the composite stiffener downward 422, each of pair of brackets 404 and segment 406 are moved downward 422.

Outward second airflow 412 and compression of L-shaped plurality of brackets 404 creates an air bearing surface to eliminate shear friction on the composite stiffener (not depicted) that can cause out of tolerance inconsistencies. Likewise, base assembly 407 is designed to be of equivalent or lower stiffness than the composite stiffener (not depicted), which then holds the bending and twisting about the longitudinal axis. Outward second airflow 412 and compression of L-shaped plurality of brackets 404 allows for the composite stiffener (not depicted) to be held in full-tension throughout forming regardless of upward or down bending.

Figure 5:
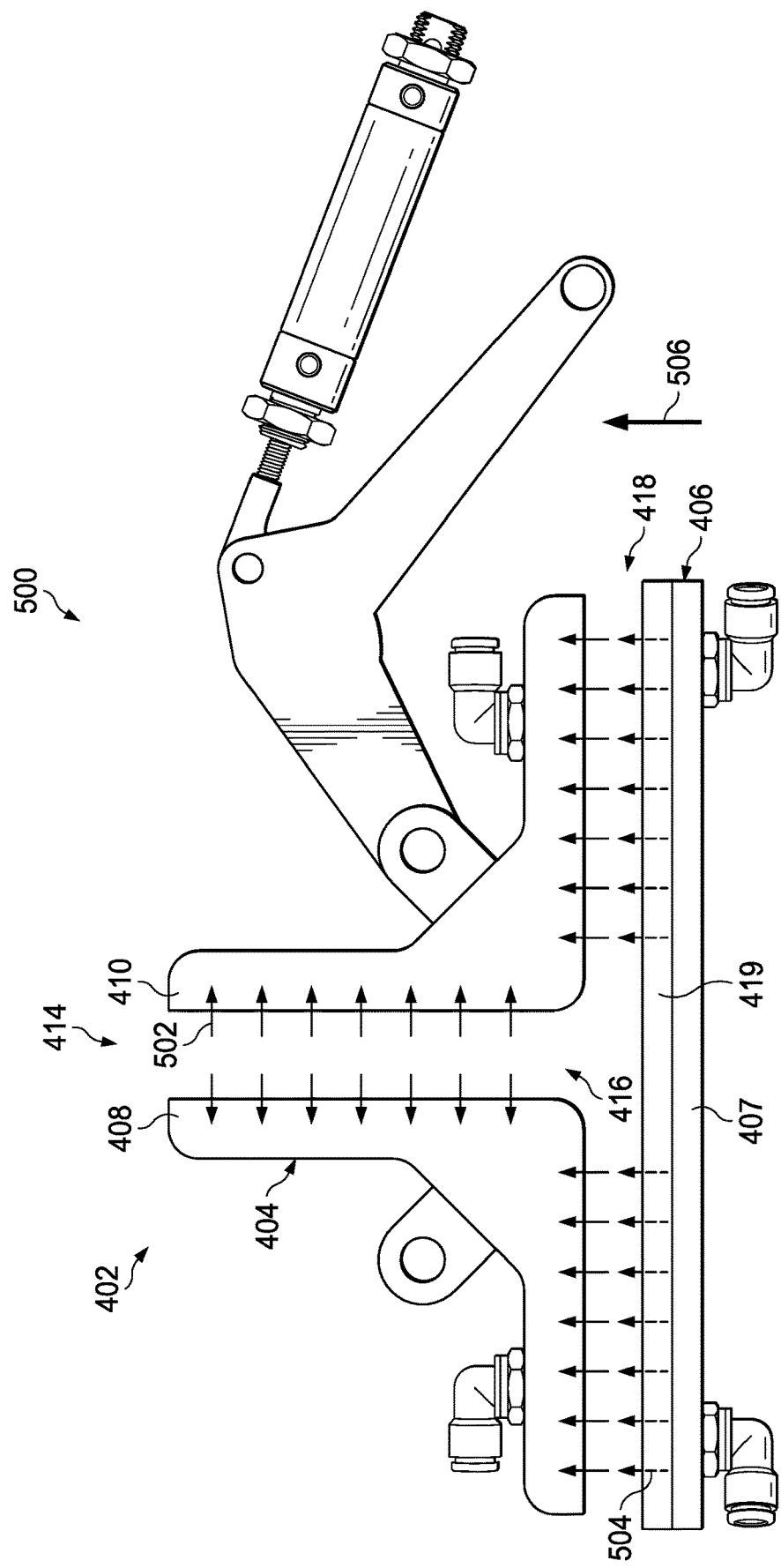
FIG. 5 is an illustration of a front view of a forming tool with indicated airflow in accordance with an illustrative embodiment.

Turning now to FIG. 5, an illustration of a front view of a forming tool with indicated airflow is depicted in accordance with an illustrative embodiment. View 500 is a view of forming tool 402 with second airflow 412 and first airflow 420 reversed.

In this illustrative example, second airflow 502 is a negative airflow. In this illustrative example, second airflow 502 through left bracket 408 and right bracket 410 is negative. In some illustrative examples, second airflow 502 is referred to as "pulling a vacuum" or "pulling a partial vacuum".

Material 419 provides first airflow 504 to forming region 414. First airflow 504 is an opposite direction to second airflow 502. First airflow 504 is a positive airflow. In this illustrative example, first airflow 504 through material 419 is positive. In some illustrative examples, providing first airflow 504 is referred to as outward air pressure.

In view 500, with negative second airflow 502 a composite stiffener (not depicted) within forming region 414 is pulled against pair of brackets 404. In view 500, with positive first airflow 504, composite stiffener (not depicted) within forming tool 402 is pushed against pair of brackets 404. In some illustrative examples, a composite stiffener (not depicted) within forming region 414 is formed upward 506 with second airflow 502 and first airflow 504 as in view 500. To form the composite stiffener upward 506, each of pair of brackets 404 and segment 406 are moved upward 506. First airflow 504 being a positive airflow allows one face of a material in forming region 414 to slip relative to material 419 to avoid wrinkling.

The illustration of forming tool 402 in FIGS. 4 and 5 is not meant to imply physical or architectural limitations to the manner in which an illustrative embodiment may be implemented. Other components in addition to or in place of the ones illustrated may be used. Some components may be unnecessary.

In some illustrative examples, material 419 is not a separate layer on segment 406. In some illustrative examples, segment 406 is formed of a porous material, such as material 419. In some illustrative examples, segment 406 has at least one of perforations or channels for distributing first airflow 420 or first airflow 504.

In some illustrative examples, material 419 is not a separate layer on segment 406. In some illustrative examples, pair of brackets 404 has a separate layer of a porous material for distributing second airflow 412 or second airflow 502. In some illustrative examples, pair of brackets 404 has at least one of perforations or channels for distributing second airflow 412 or second airflow 502. In some illustrative examples, pair of brackets 404 has a separate layer with at least one of perforations or channels for distributing second airflow 412 or second airflow 502.

Figure 6:
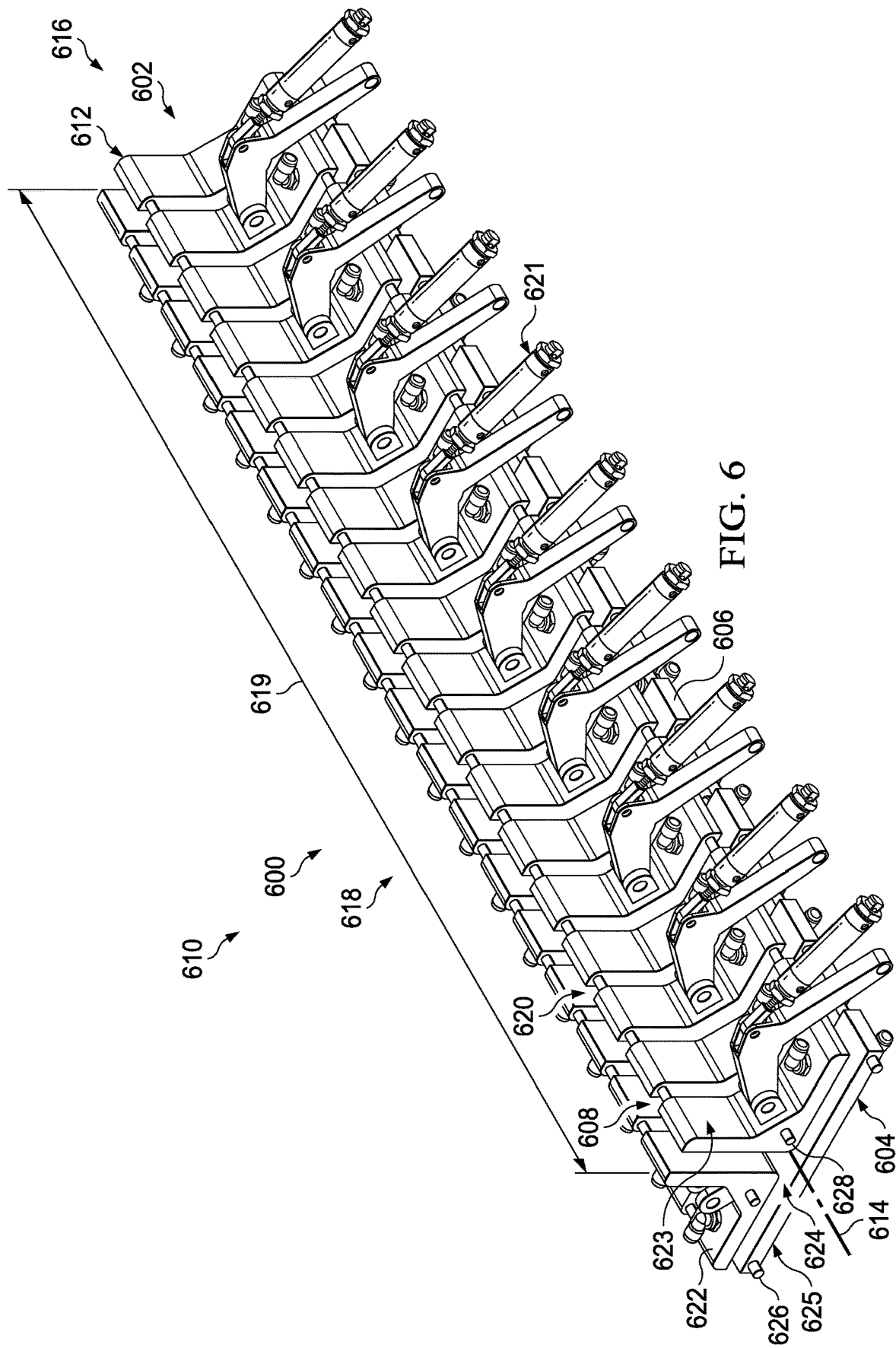
FIG. 6 is an illustration of an isometric view of a forming tool in accordance with an illustrative embodiment.

Turning now to FIG. 6, an illustration of an isometric view of a forming tool is depicted in accordance with an illustrative embodiment. Forming tool 600 is a physical implementation of forming tool 102 of FIG. 1. Forming tool 600 can be used to form composite stiffeners of wing 202, wing 204, body 206, or other components of aircraft 200 of FIG. 2. Forming tool 600 having plurality of brackets 602 and base assembly 604 can be used to form curvature 310 into composite stiffener 300. In some illustrative examples, view 610 of forming tool 600 is an isometric view of forming tool 402 of FIG. 4. In some illustrative examples, pair of brackets 404 and segment 406 are components of forming tool 600.

Base assembly 604 is formed by plurality of segments 606 and configured to provide first airflow to forming region 608 created by the base assembly 604 and plurality of brackets 602. Plurality of brackets 602 is configured to provide an airflow to forming region 608.

In view 610, plurality of brackets 602 comprises pairs of brackets 612, each pair is moveable relative to longitudinal axis 614 of forming region 608. Each pair is moveable relative to longitudinal axis 614 by at least one of rotation about longitudinal axis 614 or movement perpendicular to longitudinal axis 614.

Each pair of brackets is independently moveable relative to each other pair of brackets of plurality of brackets 602. Actuators (not all depicted) are connected to plurality of brackets 612 and base assembly 604 and configured to move plurality of brackets 602 and plurality of segments 606 of base assembly 604 within manufacturing environment 616 to change curvature 618 of forming region 608 along length 619 of forming region 608. Not all actuators are depicted in view 610. In view 610, actuators 621 are shown. Actuators 621 are connected to some of plurality of brackets 612 and are provided as only illustrative examples. As depicted, actuators 621 are pneumatic, but actuators take any desirable form.

The actuators are configured to change curvature 618 of forming region 608 while maintaining cross-section 620 of forming region 608. To maintain cross-section 620 of forming region 608, a pair of brackets of plurality of brackets 612 and a respective segment of plurality of segments 606 maintain their orientations relative to each other. For example, to maintain T-shaped 624 cross-section 620, pair of brackets 623 and segment 625 maintain their orientations relative to each other as pair of brackets 623 and segment 625 move relative to the remainder of plurality of brackets 612 and plurality of segments 606. By maintaining pair of brackets 623 and segment 625 relative to each other, T-shaped 624 cross-section 620 is maintained between pair of brackets 623 and segment 625.

As depicted, plurality of brackets 612 each has L-shaped cross-section 622. Plurality of brackets 612 each having L-shaped cross-section 622 creates T-shaped 624 cross-section 620 of forming region 608.

Plurality of brackets 612 has any desirable features to provide airflow to forming region 608. In some illustrative examples, plurality of brackets 612 is formed of a porous material to provide the airflow to forming region 608. In some illustrative examples, plurality of brackets 612 includes at least one of perforations or channels to provide the airflow to forming region 608.

Plurality of segments 606 has any desirable features to provide airflow to forming region 608. In some illustrative examples, plurality of segments 606 of base assembly 604 is formed of a porous material to provide the airflow to forming region 608. In some illustrative examples, plurality of segments 606 of the base assembly 604 includes at least one of perforations or channels to provide the airflow to forming region 608.

Compliant connectors 626 extend through and connect plurality of segments 606. Compliant connectors 626 extend through holes in plurality of segments 606. Compliant connectors 626 take any desirable form. As depicted, compliant connectors 626 are flexible polymeric tubes. In some illustrative examples, compliant connectors 626 are rubber cords. Actuated locks (not depicted) are configured to selectively restrain plurality of segments 606 relative to compliant connectors 626.

Plurality of segments 606 move along compliant connectors 626 unless actuated locks are engaged. When the actuated locks are engaged, plurality of segments 606 are restrained relative to compliant connectors 626. By selectively restraining plurality of segments 606 relative to compliant connectors 626, spacing between plurality of segments 606 is controlled. Controlling spacing between plurality of segments 606 controls the stiffness of base assembly 604. Controlling spacing between plurality of segments 606 maintains tension within a composite stiffener in forming region 608.

Compliant connectors 628 extend through and connect plurality of brackets 612. Compliant connectors 628 extend through holes in plurality of brackets 612. Compliant connectors 628 take any desirable form. As depicted, compliant connectors 628 are flexible polymeric tubes. Actuated locks (not depicted) configured to selectively restrain plurality of brackets 612 relative to compliant connectors 628. The actuated locks can be referred to as brakes.

Plurality of brackets 612 move along compliant connectors 628 unless actuated locks are engaged. When the actuated locks are engaged, plurality of brackets 612 are restrained relative to compliant connectors 628. By selectively restraining plurality of brackets 612 relative to compliant connectors 628, spacing between plurality of brackets 612 is controlled. Controlling spacing between plurality of brackets 612 prevents or reduces inconsistencies in the composite stiffener in forming region 608.

L-Shaped plurality of brackets 612 are held in place by compliant connectors 628 (rods) that go through all the brackets. When airflow is present through plurality of brackets 612, plurality of brackets 612 are moving to place a curvature into a composite stiffener. When airflow is present through plurality of brackets 612, the actuated locks are released so plurality of brackets 612 can slide along compliant connectors 628. When the airflow is terminated, the actuated locks engage and keep plurality of brackets 612 in current orientation. Afterwards, the curvature has been formed in the composite stiffener and it is ready for transporting by a pick and place machine.

Synchronized movement of plurality of brackets 602 and plurality of segments 606 is used to form a curvature into a composite stiffener. The movement of plurality of brackets 602 and plurality of segments 606 is a slow, progressive movement. By progressively moving plurality of segments 606, a curve is approximated by the series of straight segments.

The illustration of forming tool 600 in FIG. 6 is not meant to imply physical or architectural limitations to the manner in which an illustrative embodiment may be implemented. Other components in addition to or in place of the ones illustrated may be used. Some components may be unnecessary.

In some illustrative examples, a porous material is present as a separate layer on at least one of plurality of brackets 602 or plurality of segments 606. In some illustrative examples, a separate layer with at least one of channels or perforations is present on at least one of plurality of brackets 602 or plurality of segments 606 to distribute airflow.

Figure 7:
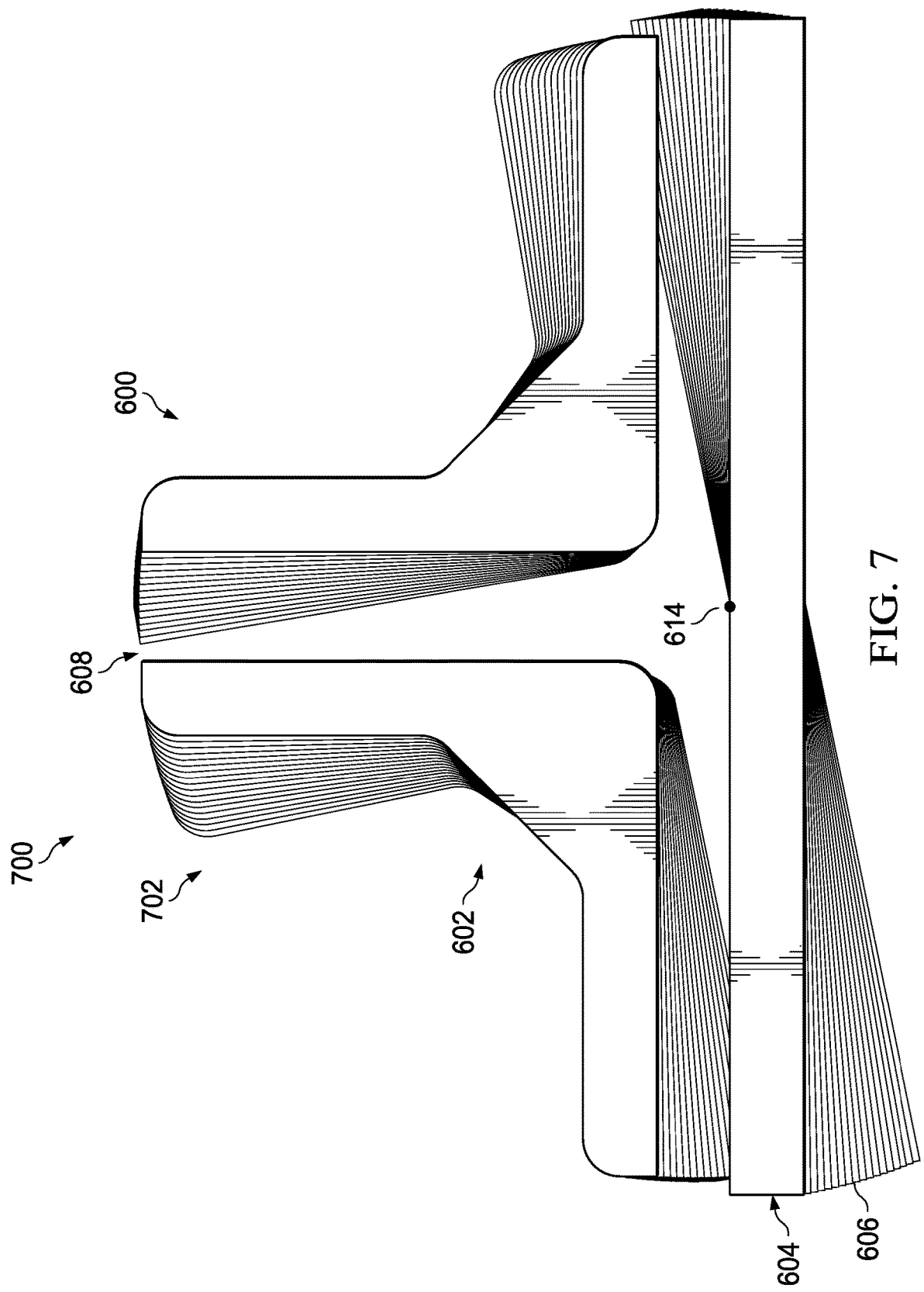
FIG. 7 is an illustration of a simplified front view of a forming tool in accordance with an illustrative embodiment.

Turning now to FIG. 7, an illustration of a simplified front view of a forming tool is depicted in accordance with an illustrative embodiment. View 700 is a view of forming tool 600 during movement of plurality of brackets 602 and base assembly 604 to form a curvature into a composite stiffener (not depicted). In view 700, some of plurality of brackets 602 and some of plurality of segments 606 of base assembly 604 have been rotated about longitudinal axis 614 of forming region 608. In view 700, plurality of brackets 602 and plurality of segments 606 are in position 702 to place a roll into a composite stiffener (not shown). As each pair of brackets and a respective segment is rotated about longitudinal axis 614, the legs of each pair of brackets is maintained being parallel with a corresponding segment during the forming process.

Figure 8:
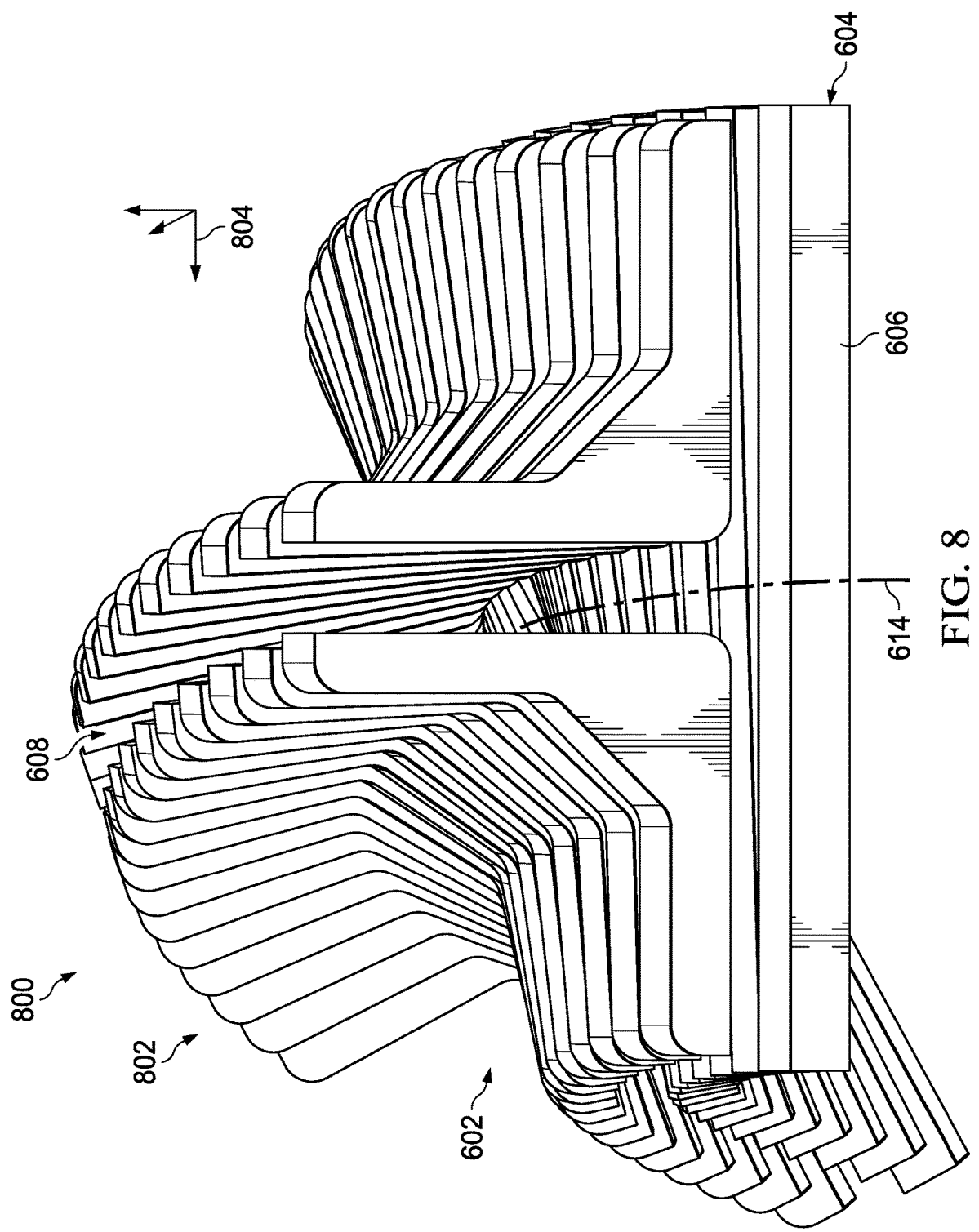
FIG. 8 is an illustration of a simplified top perspective view of a forming tool in accordance with an illustrative embodiment.

Turning now to FIG. 8, an illustration of a simplified top perspective view of a forming tool is depicted in accordance with an illustrative embodiment. View 800 is a top perspective view of forming tool 600 during movement of plurality of brackets 602 and base assembly 604 to form a curvature into a composite stiffener (not depicted). In view 800, some of plurality of brackets 602 and some of plurality of segments 606 of base assembly 604 have been rotated about longitudinal axis 614 of forming region 608. Each pair of brackets is rotated while maintaining a parallel relationship of the legs of the pair of brackets and a respective segment. Plurality of brackets 602 and plurality of segments 606 are in position 802 to place a roll into a composite stiffener (not shown). Additionally, in view 800, longitudinal axis 614 of forming region 608 has been curved in X-axis 804. Plurality of brackets 602 and plurality of segments 606 have been moved up and/or down to introduce yaw into the composite stiffener.

Figure 9:
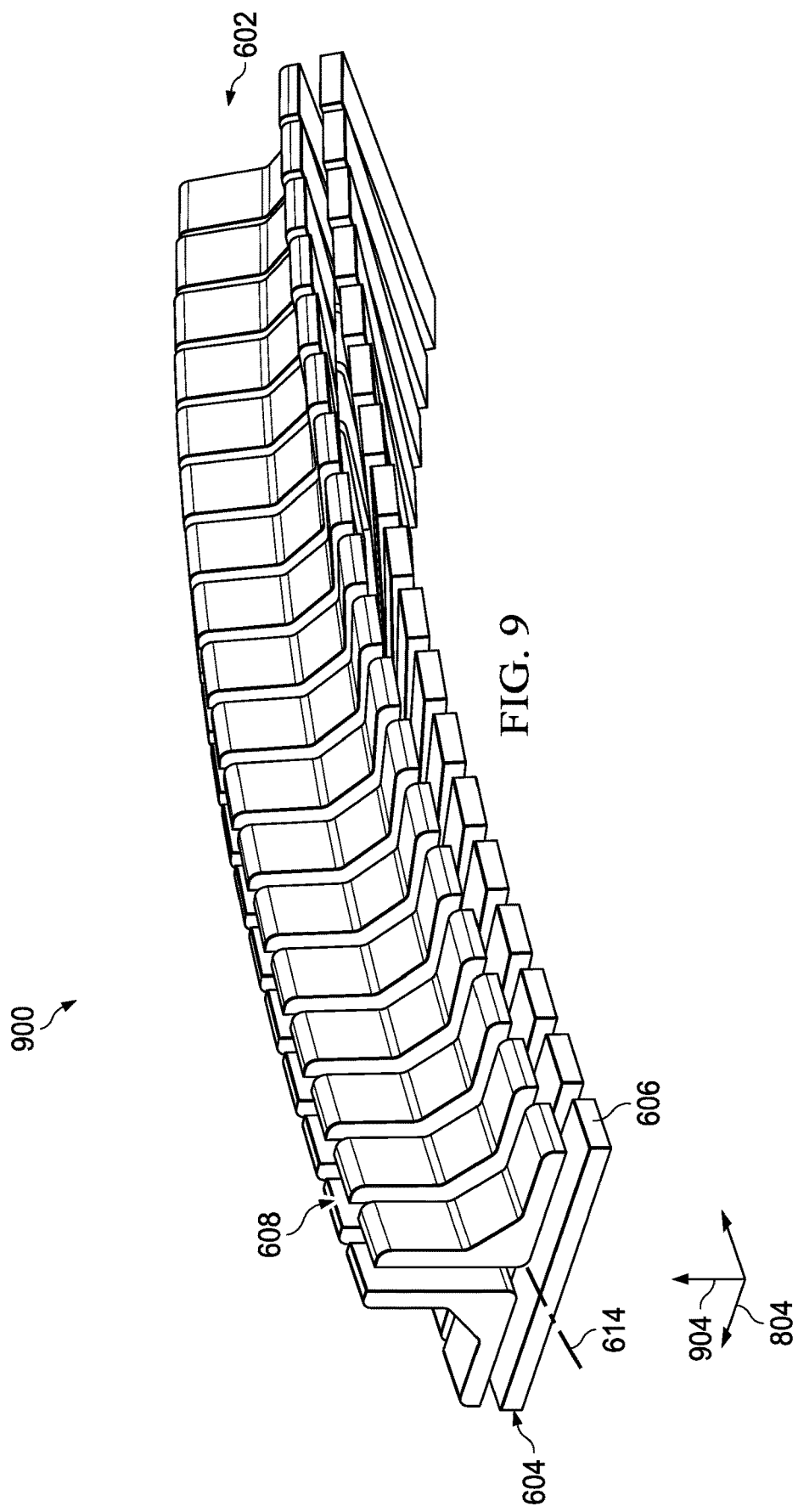
FIG. 9 is an illustration of a simplified side perspective view of a forming tool in accordance with an illustrative embodiment.

Turning now to FIG. 9, an illustration of a simplified side perspective view of a forming tool is depicted in accordance with an illustrative embodiment. View 900 is a top perspective view of forming tool 600 during movement of plurality of brackets 602 and base assembly 604 to form a curvature into a composite stiffener (not depicted). In view 900, some of plurality of brackets 602 and some of plurality of segments 606 of base assembly 604 have been rotated about longitudinal axis 614 of forming region 608. Plurality of brackets 602 and plurality of segments 606 are in position 902 to place a roll into a composite stiffener (not shown). Additionally, in view 900, longitudinal axis 614 of forming region 608 has been curved in Y-axis 904. Plurality of brackets 602 and plurality of segments 606 have been moved to introduce pitch into the composite stiffener. During movement of plurality of brackets 602 and plurality of segments 606, each pair of brackets is maintained parallel to a respective segment of plurality of segments 606.

The illustration of forming tools, forming tool 402 and forming tool 600 in FIGS. 4-9 are not meant to imply physical or architectural limitations to the manner in which an illustrative embodiment may be implemented. Other components in addition to or in place of the ones illustrated may be used. Some components may be unnecessary.

For example, in FIGS. 4-9, depictions of or lack thereof of actuators to control motion and rotation of both plurality of brackets 602 and base assembly 604 are not limiting. For example, actuators are not depicted to move plurality of segments 606 of base assembly 604. The actuators to move plurality of segments 606 of base assembly 604 take any desirable form. Actuators to move plurality of brackets 602 also take any desirable form. The depicted air cylinder rods are not limiting to the manner in which actuators for plurality of brackets 602 may be implemented.

Figure 10:
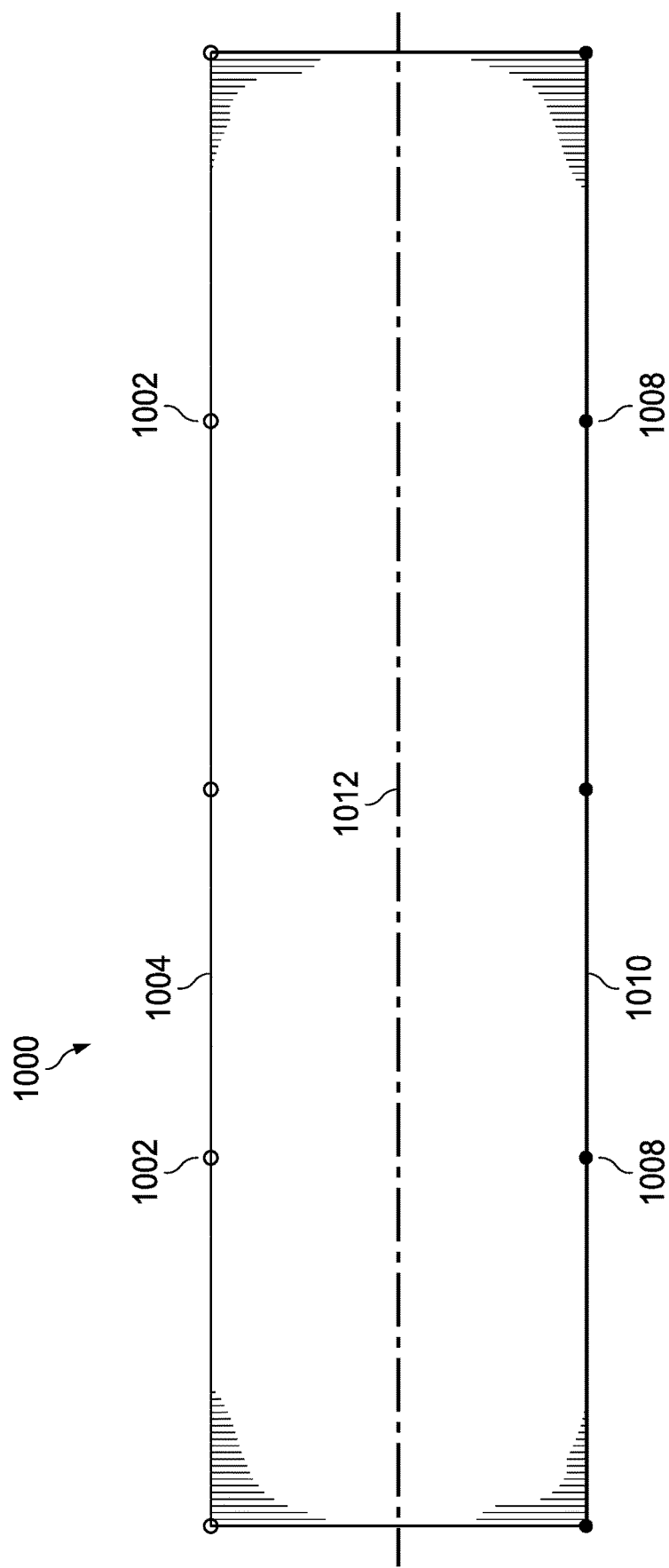
FIG. 10 is an illustration of a simplified side view of a material prior to forming a curvature in accordance with an illustrative embodiment.

Turning now to FIG. 10, an illustration of a simplified side view of a material prior to forming a curvature is depicted in accordance with an illustrative embodiment. In view 1000, plurality of points 1002 on first side 1004 of material 1006 is evenly spaced. In view 1000, plurality of points 1008 on second side 1010 of material 1006 is evenly spaced. Longitudinal axis 1012 is positioned between first side 1004 and second side 1010.

If material 1006 were to be formed into a curve by hand, distances between at least one of plurality of points 1002 or plurality of points 1008 would decrease. If material 1006 were to be formed into a curve by hand, compression would be introduced into at least one of first side 1004 or second side 1010. In one illustrative example, if material 1006 were to be formed into a curve by hand, distance between plurality points 1008 would decrease and compression would be introduced into second side 1010.

Figure 11:
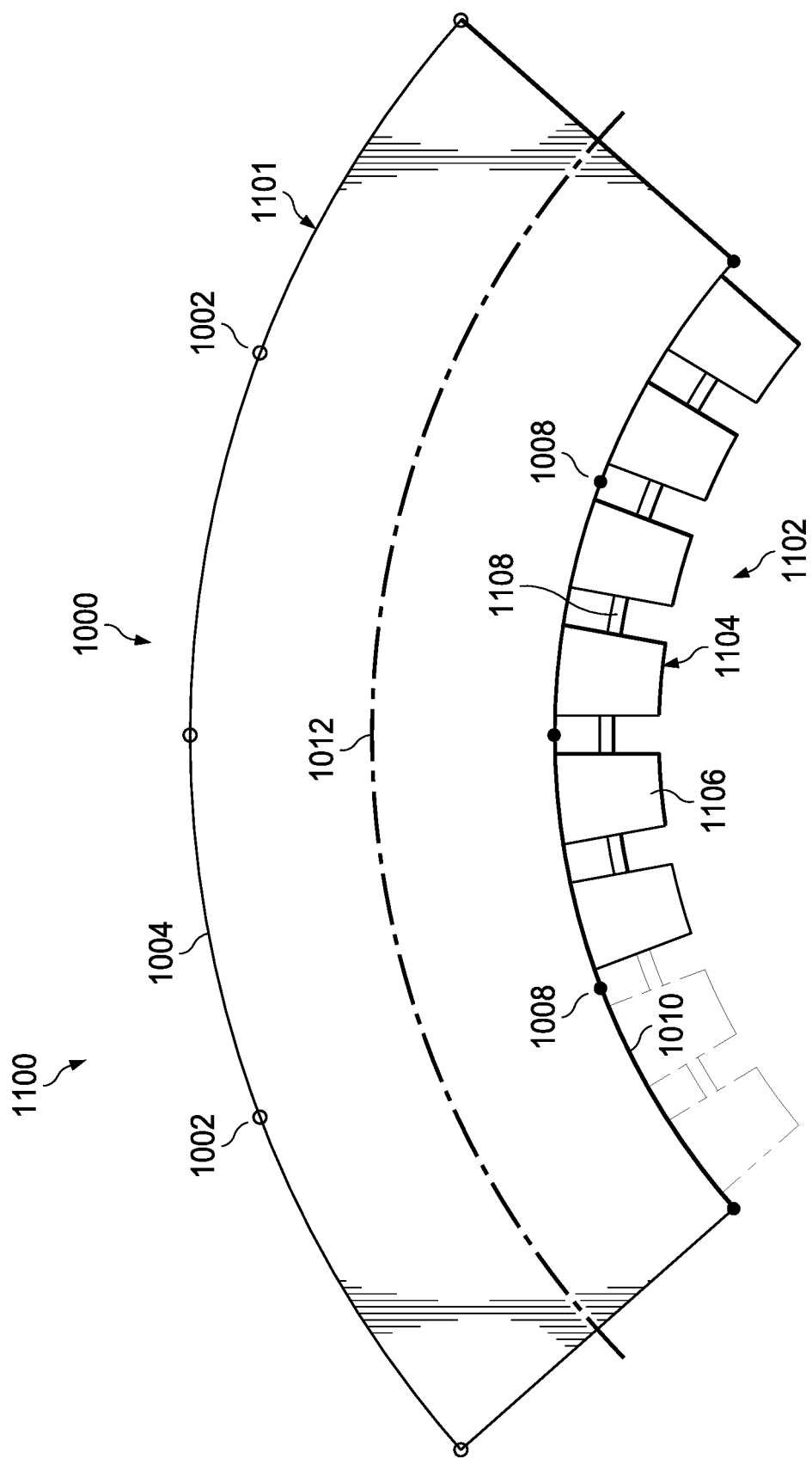
FIG. 11 is an illustration of a simplified side view of a material while forming a curvature using a forming tool in accordance with an illustrative embodiment.

Turning now to FIG. 11, an illustration of a simplified side view of a material while forming a curvature using a forming tool is depicted in accordance with an illustrative embodiment. In view 1100, the curve placed into material 1006 is an exaggerated curve for demonstrative purposes.

View 1100 is a view of material 1006 of FIG. 10 with curvature 1101 formed using forming tool 1102. Forming tool 1102 comprises a plurality of brackets (not depicted) and base assembly 1104. Base assembly 1104 comprises plurality of segments 1106. Plurality of segments 1106 are connected by compliant connectors, including compliant connector 1108.

To reduce compression forces in material 1006 during forming curvature 1101, distances between plurality of segments 1106 are controlled by locking and unlocking plurality of segments 1106 relative to compliant connector 1108.

Although lengths between plurality of points 1002 on first side 1004 of material 1006 have increased due to curvature 1101, lengths between plurality of points 1008 are maintained. Although lengths between plurality of points 1002 on first side 1004 of material 1006 have increased due to curvature 1101, material 1006 is maintained in tension. Maintaining lengths between plurality of points 1008 on second side 1010 reduces or eliminates compression in material 1006 and maintains material 1006 in tension. Forming curvature 1101 using forming tool 1102 provides tension to a greater amount of material 1006 than forming curvature 1101 using conventional processes or conventional tools.

In some illustrative examples, forming curvature 1101 is controlled by a controller, such as controller 192 of FIG. 1. The controller is configured to send commands to forming tool 1102 to form curvature 1101 into material 1006. In some illustrative examples, the controller sends commands to form curvature 1101 based on at least one of a scan of the desired location, a model of the final curvature of the material, or a model of the desired location for the material.

Figure 12:
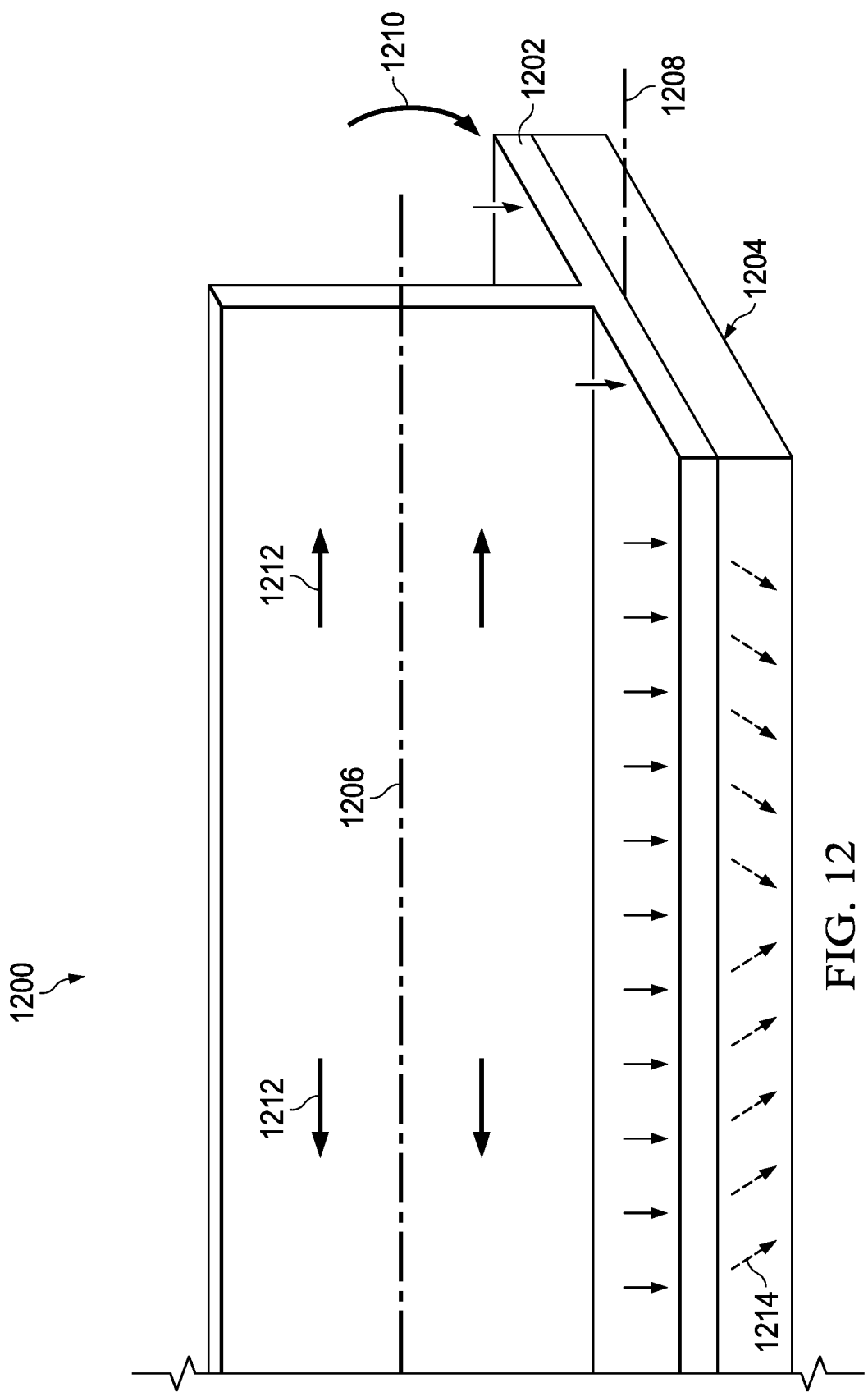
FIG. 12 is an illustration of forces within a composite stiffener as a curvature is formed in the composite stiffener by a forming tool in accordance with an illustrative embodiment.

Turning now to FIG. 12, an illustration of forces within a composite stiffener is depicted in accordance with an illustrative embodiment. The illustration of forces in FIG. 12 is depicted as a curvature is formed in the composite stiffener by a forming tool. Composite stiffener 1200 is a physical implementation of composite stiffener 106 of FIG. 1. Composite stiffener 1200 is positioned on plurality of segments 1202 of base assembly 1204. Base assembly 1204 is part of a forming tool having a plurality of brackets (not depicted). The plurality of brackets is not depicted for purpose of illustration.

Plurality of segments 1202 may be a physical implementation of plurality of segments 132 of forming tool 102 of FIG. 1. Segment 406 of FIGS. 4-5 may be one of plurality of segments 1202 of FIG. 12. In some illustrative examples, plurality of segments 606 of FIGS. 6-9 is the same as plurality of segments 1202 of FIG. 12. In some illustrative examples, plurality of segments 1106 of FIG. 11 is the same as plurality of segments 1202 of FIG. 12.

Composite stiffener 1200 has neutral axis 1206. Neutral axis 1206 is longitudinal axis 1207 of composite stiffener 1200. If composite stiffener 1200 were twisted or bent around neutral axis 1206, tension would be present on one side of neutral axis 1206 and compression would be present on the opposite side of neutral axis 1206. Introducing an undesirable amount of compression to composite stiffener 1200 introduces out of tolerance inconsistencies, such as wrinkles, into composite stiffener 1200.

Plurality of segments 1202 has an equivalent stiffness or lower stiffness than composite stiffener 1200. Plurality of segments 1202 holds composite stiffener 1200 during bending and twisting of composite stiffener 1200. By plurality of segments 1202 having an equivalent stiffness to composite stiffener 1200, the longitudinal axis about which composite stiffener 1200 bends and twists is lowered. By plurality of segments 1202 having an equivalent stiffness to composite stiffener 1200, the longitudinal axis about which composite stiffener 1200 bends and twists moves from neutral axis 1206 to desired axis 1208. This design approach shifts the longitudinal axis so that composite stiffener 1200 is kept under tension by moving the longitudinal axis down to where base assembly 1204 meets composite stiffener 1200. The longitudinal axis is shifted from neutral axis 1206 to desired axis 1208 by forcing composite stiffener 1200 downward 1210 by a vacuum pulled through plurality of segments 1202.

Bending and twisting composite stiffener 1200 about desired axis 1208 holds composite stiffener 1200 in tension throughout composite stiffener 1200 regardless of upward or downward bending of composite stiffener 1200. Bending and twisting composite stiffener 1200 about desired axis 1208 places base assembly 1204 into compression. For example, as composite stiffener 1200 is bent downward 1210, tension 1212 is maintained within composite stiffener 1200 and compression 1214 is present in base assembly 1204. In some illustrative examples, by base assembly 1204 taking on the bulk of the compression, while composite stiffener 1200 is held in tension, wrinkle formation is reduced or prevented. In some illustrative examples, if small wrinkles are present in composite stiffener 1200, these small wrinkles are pulled/straightened out by maintaining tension in composite stiffener 1200.

This forming tool design is used for soft manipulation of parts that desirably have stringent control of the bending and twisting about a dimensioned/defined longitudinal axis. The forming tool provides for at least one of consistent part formation and out of tolerance inconsistency prevention.

Figure 13:
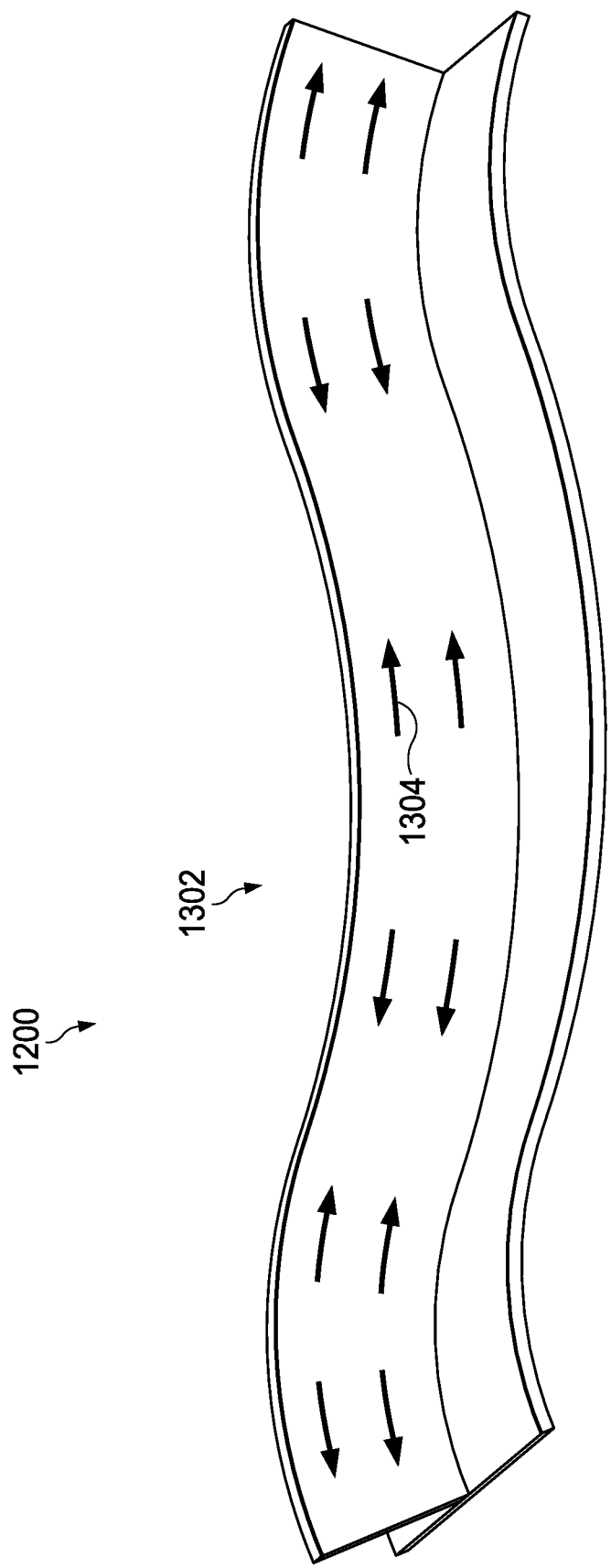
FIG. 13 is an illustration of forces within a composite stiffener with a curvature formed by a forming tool in accordance with an illustrative embodiment.

Turning now to FIG. 13, an illustration of forces within a composite stiffener with a curvature formed by a forming tool is depicted in accordance with an illustrative embodiment. View 1300 is a view of composite stiffener 1200 with curvature 1302 formed by a forming tool including plurality of segments 1202. Composite stiffener 1200 is held in tension 1304 throughout all of composite stiffener 1200. In view 1300, the blade and the flange of composite stiffener 1200 are in tension 1304.

Figure 14:
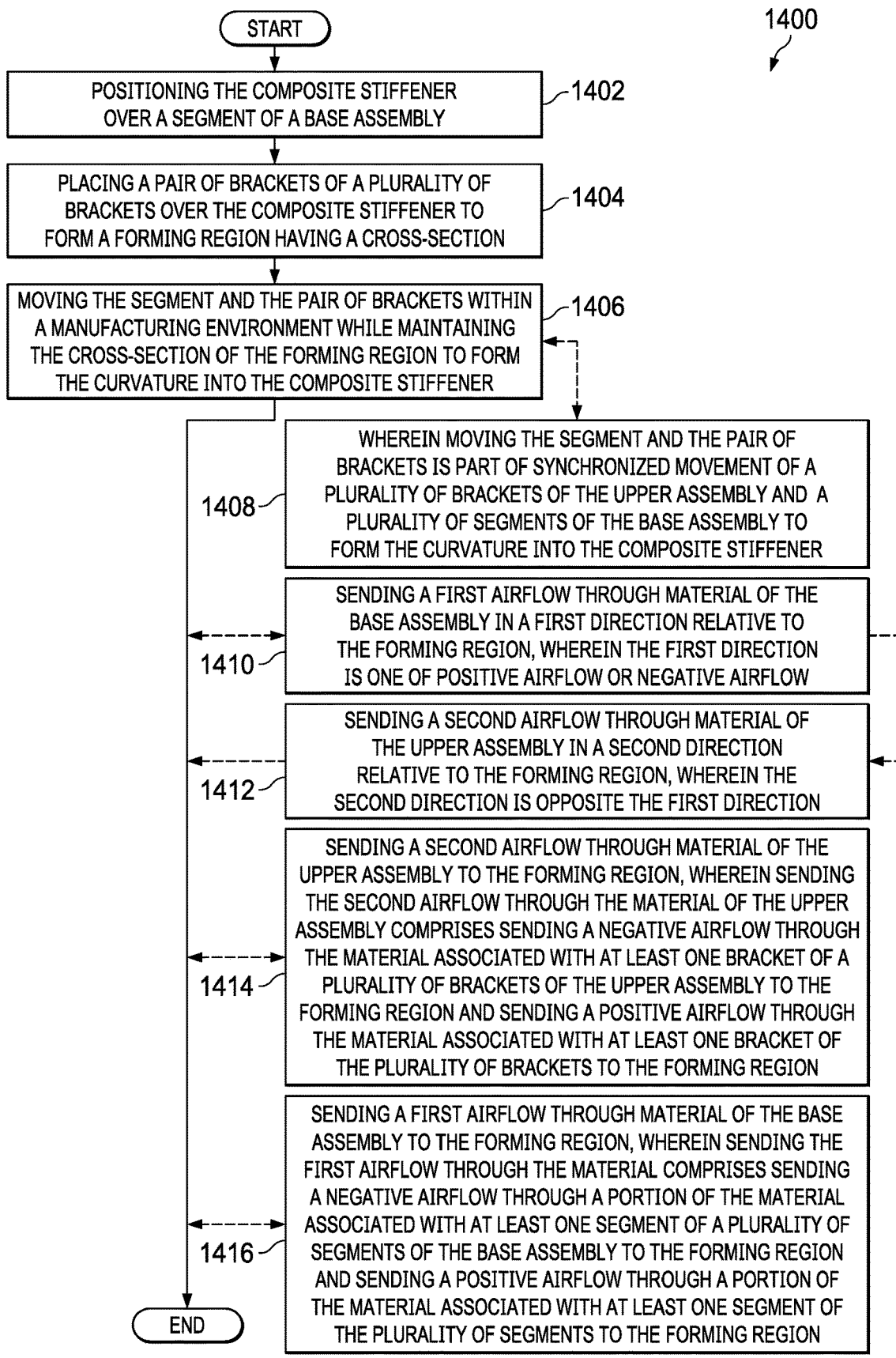
FIG. 14 is an illustration of a flowchart of a method of forming a curvature into a composite stiffener in accordance with an illustrative embodiment.

Turning now to FIG. 14, an illustration of a flowchart of a method of forming a curvature into a composite stiffener is depicted in accordance with an illustrative embodiment. In some illustrative examples, method 1400 is implemented in manufacturing environment 100 using forming tool 102. In some illustrative examples, method 1400 is implemented to form a composite stiffener of aircraft 200 of FIG. 2. In some illustrative examples, method 1400 is implemented to form curvature 310 into composite stiffener 300 of FIG. 3. In some illustrative examples, method 1400 is implemented using forming tool 402 of FIGS. 4-5. In some illustrative examples, method 1400 is implemented using forming tool 600 of FIGS. 6-9. In some illustrative examples, method 1400 is implemented to form a curvature into material 1006 of FIGS. 10-11.

Method 1400 positions the composite stiffener over a segment of a base assembly (operation 1402). In some illustrative examples, the segment is one of a plurality of segments of the base assembly. Method 1400 places a pair of brackets of a plurality of brackets over the composite stiffener to form a forming region having a cross-section (operation 1404). Method 1400 moves the segment and the pair of brackets within a manufacturing environment while maintaining the cross-section of the forming region to form the curvature into the composite stiffener (operation 1406). Afterwards, method 1400 terminates.

In some illustrative examples, moving the segment and the pair of brackets is part of synchronized movement of a plurality of brackets of the upper assembly and a plurality of segments of the base assembly to form the curvature into the composite stiffener (operation 1408). In some illustrative examples, the synchronized movement is controlled by a controller, such as controller 192 of FIG. 1. The controller is configured to send commands to the forming tool to form a curvature into the composite stiffener. In some illustrative examples, the controller sends commands to form the curvature based on at least one of a scan of the composite skin, a model of composite stiffener, or a model of the composite skin.

In some illustrative examples, method 1400 sends a first airflow through material of the base assembly in a first direction relative to the forming region, wherein the first direction is one of positive airflow or negative airflow (operation 1410). In some illustrative examples, method sends a second airflow through material of the upper assembly in a second direction relative to the forming region, wherein the second direction is opposite the first direction (operation 1412).

In some illustrative examples, method 1400 sends a second airflow through a material of the upper assembly to the forming region, wherein sending the second airflow through the material of the upper assembly comprises sending a negative airflow through the material associated with at least one bracket of a plurality of brackets of the upper assembly to the forming region and sending a positive airflow through the material associated with at least one bracket of the plurality of brackets to the forming region (operation 1414).

In some illustrative examples, method 1400 sends a first airflow through material of the base assembly to the forming region, wherein sending the first airflow through the material comprises sending a negative airflow through a portion of the material associated at least one segment of a plurality of segments of the base assembly to the forming region and sending a positive airflow through a portion of the material associated with at least one segment of the plurality of segments to the forming region (operation 1416).

Figure 15:
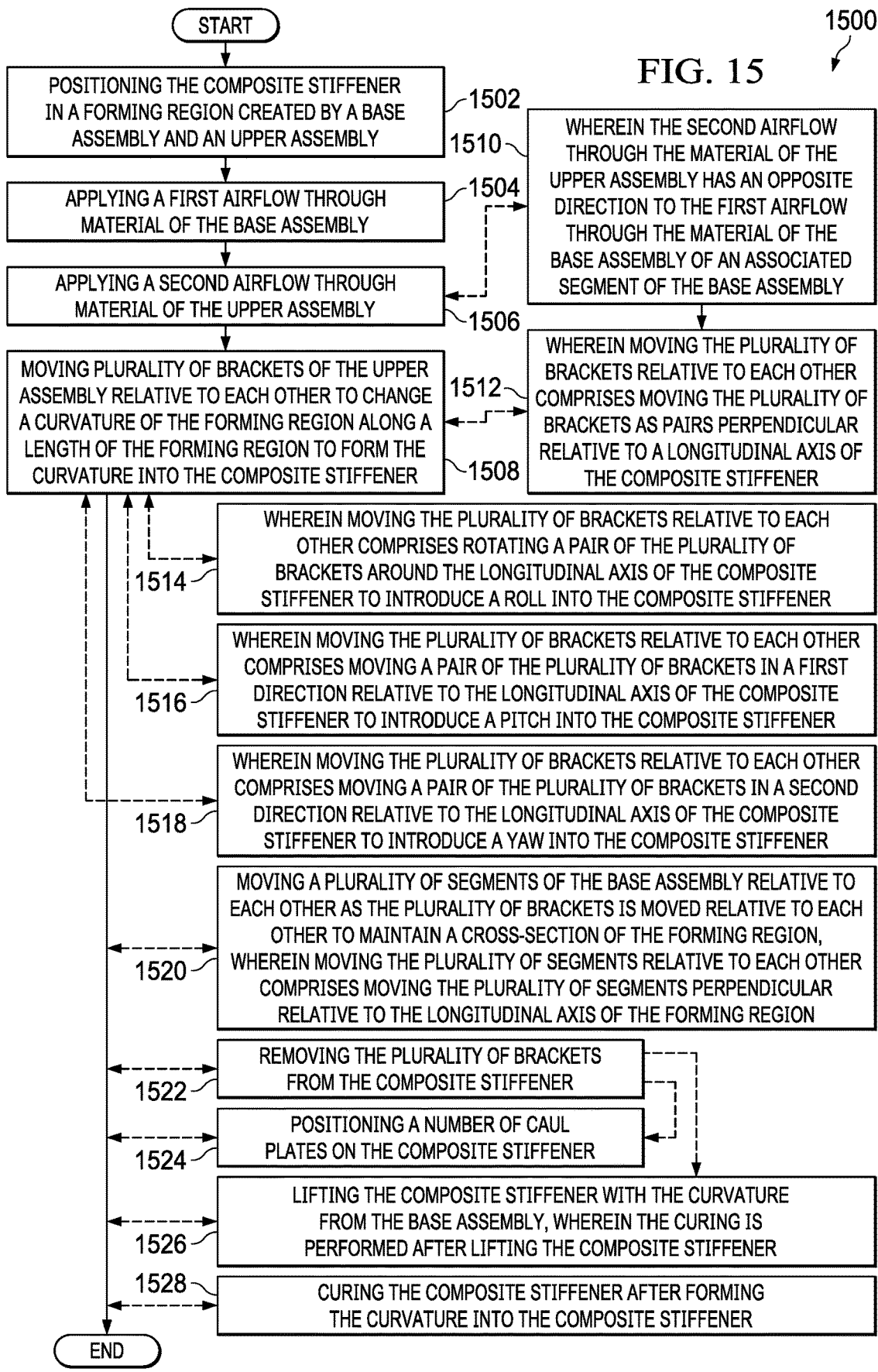
FIG. 15 is an illustration of a flowchart of a method of forming a curvature into a composite stiffener in accordance with an illustrative embodiment.

Turning now to FIG. 15, an illustration of a flowchart of a method of forming a curvature into a composite stiffener is depicted in accordance with an illustrative embodiment. In some illustrative examples, method 1500 is implemented in manufacturing environment 100 using forming tool 102. In some illustrative examples, method 1500 is implemented to form a composite stiffener of aircraft 200 of FIG. 2. In some illustrative examples, method 1500 is implemented to form curvature 310 into composite stiffener 300 of FIG. 3. In some illustrative examples, method 1500 is implemented using forming tool 402 of FIGS. 4-5. In some illustrative examples, method 1500 is implemented using forming tool 600 of FIGS. 6-9. In some illustrative examples, method 1500 is implemented to form a curvature into material 1006 of FIGS. 10-11.

Method 1500 positions the composite stiffener in a forming region created by a base assembly and an upper assembly (operation 1502). Method 1500 applies a first airflow through a material of the base assembly (operation 1504). Method 1500 applies a second airflow through a material of the upper assembly (operation 1506). Method 1500 moves a plurality of brackets of the upper assembly relative to each other to change a curvature of the forming region along a length of the forming region to form the curvature into the composite stiffener (operation 1508). Afterwards, method 1500 terminates.

In some illustrative examples, the movement of the plurality of brackets is controlled by a controller, such as controller 192 of FIG. 1. The controller is configured to send commands to the forming tool to form the curvature into the composite stiffener. In some illustrative examples, the controller sends commands to form the curvature based on at least one of a scan of the composite skin, a model of composite stiffener, or a model of the composite skin. In some illustrative examples, the controller monitors a state of the forming tool by sensors attached to the tool. In some illustrative examples, sensors are associated with components of the, such as upper assembly 129 of FIG. 1, or components of a base assembly, such as base assembly 130 of FIG. 1. When present, sensors provide the controller with location data for components of the forming tool.

In some illustrative examples, the airflow through a pair of brackets is a positive airflow through a first bracket of the pair of brackets and a negative airflow through a second bracket of the pair of brackets. In some illustrative examples, the second airflow through the material of the upper assembly has an opposite direction to the first airflow through the material of the base assembly of an associated segment of the base assembly (operation 1510). By the airflow through the pair of brackets having an opposite direction of the associated segment, an air bearing surface is created that prevents friction with the composite stiffener. By the airflow through the pair of brackets having an opposite direction of the associated segment, the composite stiffener is held against one of the pair of brackets or the associated segment during forming of the composite stiffener.

In some illustrative examples, moving the plurality of brackets relative to each other comprises moving the plurality of brackets as pairs perpendicular relative to a longitudinal axis of the composite stiffener (operation 1512). In some illustrative examples, moving the plurality of brackets relative to each other comprises rotating a pair of the plurality of brackets around the longitudinal axis of the composite stiffener to introduce a roll into the composite stiffener (operation 1514). In some illustrative examples, moving the plurality of brackets relative to each other comprises moving a pair of the plurality of brackets in a first direction relative to the longitudinal axis of the composite stiffener to introduce a pitch into the composite stiffener (operation 1516). In some illustrative examples, moving the plurality of brackets relative to each other comprises moving a pair of the plurality of brackets in a second direction relative to the longitudinal axis of the composite stiffener to introduce a yaw into the composite stiffener (operation 1518). In some illustrative examples, method 1500 moves a plurality of segments of the base assembly relative to each other as the plurality of brackets is moved relative to each other to maintain a cross-section of the forming region, wherein moving the plurality of segments relative to each other comprises moving the plurality of segments perpendicular relative to the longitudinal axis of the forming region. (operation 1520).

In some illustrative examples, method 1500 cures the composite stiffener after forming the curvature into the composite stiffener (operation 1528). In some illustrative examples, the composite stiffener is cured prior to lifting the composite stiffener from the forming tool. In other illustrative examples, the composite stiffener is cured when it is in contact with a desired location, such as a wing panel.

In some illustrative examples, method 1500 removes the plurality of brackets from the composite stiffener (operation 1522); and method 1500 lifts the composite stiffener with the curvature from the base assembly, wherein the curing is performed after lifting the composite stiffener (operation 1526). In some illustrative examples, the composite stiffener is lifted by a pick and place system with set headers.

In some illustrative examples, method 1500 removes the plurality of brackets from the composite stiffener (operation 1522). In some illustrative examples, method 1500 positions a number of caul plates on the composite stiffener (operation 1524). In some illustrative examples, the number of caul plates protect the curvature of the composite stiffener. In some illustrative examples, the number of caul plates are equipment for curing the composite stiffener. As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 1408 through operation 1416 may be optional. As another example, operation 1510 through operation 1528 may be optional.

Figure 16:
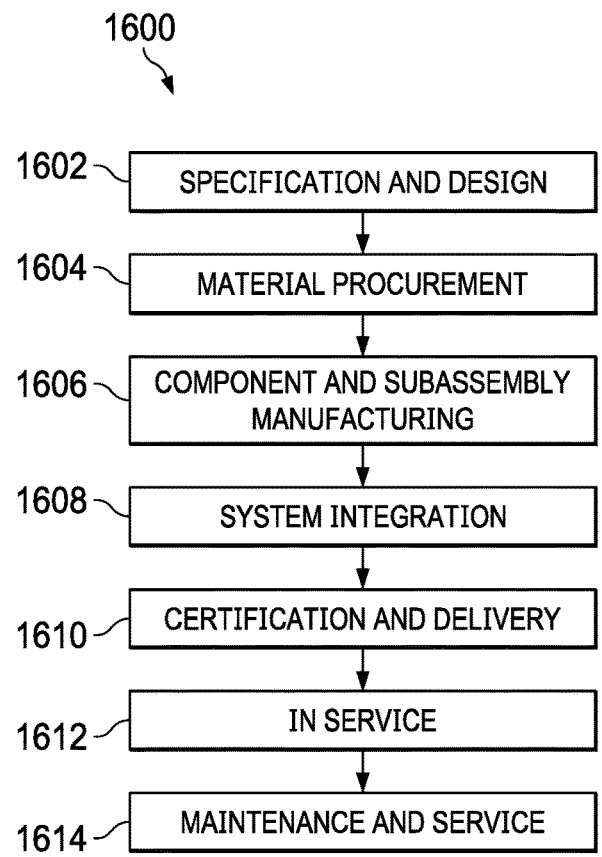
FIG. 16 is an illustration of an aircraft manufacturing and service method in a form of a block diagram in accordance with an illustrative embodiment.
Figure 17:
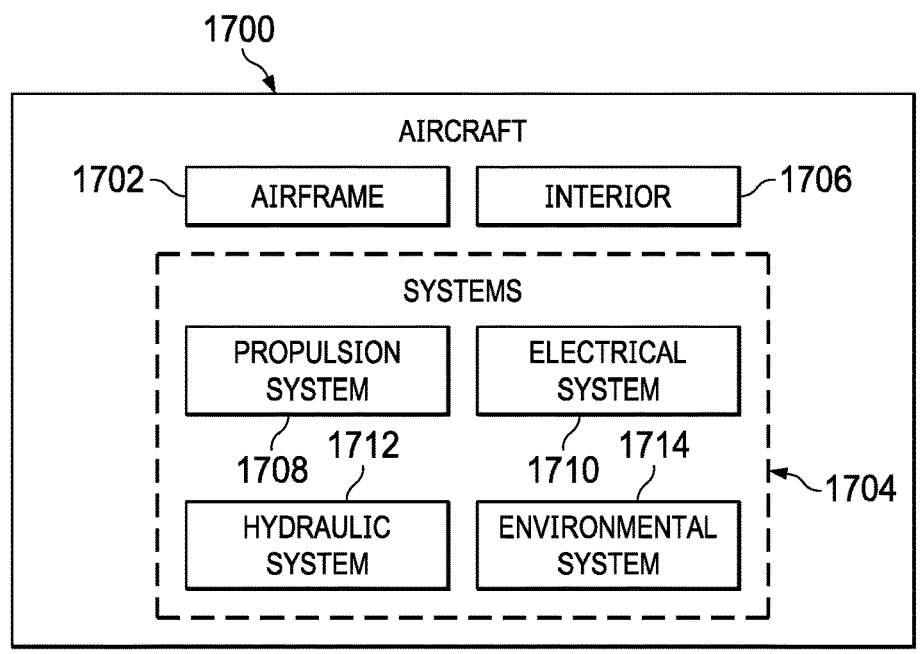
FIG. 17 is an illustration of an aircraft in a form of a block diagram in which an illustrative embodiment may be implemented.

Illustrative embodiments of the present disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an illustrative embodiment. During preproduction, aircraft manufacturing and service method 1600 may include specification and design 1602 of aircraft 1700 in FIG. 17 and material procurement 1604.

During production, component and subassembly manufacturing 1606 and system integration 1608 of aircraft 1700 takes place. Thereafter, aircraft 1700 may go through certification and delivery 1610 in order to be placed in service 1612. While in service 1612 by a customer, aircraft 1700 is scheduled for routine maintenance and service 1614, which may include modification, reconfiguration, refurbishment, or other maintenance and service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. In this example, aircraft 1700 is produced by aircraft manufacturing and service method 1600 of FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included.

Apparatuses and methods embodied herein may be employed during at least one of the stages of aircraft manufacturing and service method 1600. One or more illustrative embodiments may be manufactured or used during at least one of component and subassembly manufacturing 1606, system integration 1608, in service 1612, or maintenance and service 1614 of FIG. 16. Aircraft 1700 may include composite stiffener 106 of FIG. 1 formed using forming tool 102. Composite stiffener 106 may be formed during component and subassembly manufacturing 1606. As an example, method 1400 may be used during component and subassembly manufacturing 1606 to form a curvature in a composite stiffener of aircraft 1700. As another example, method 1500 may be used during component and subassembly manufacturing 1606 to form a curvature in a composite stiffener of aircraft 1700.

The presented forming tool design is configured for soft manipulation of parts that desirably have stringent control of the bending, lofting, and twisting about a dimensioned/defined longitudinal axis. The forming tool provides for at least one of consistent part formation or out of tolerance inconsistency prevention.

The illustrative examples provide a technical solution to the problem of forming a curvature into a composite stiffener without introducing out of tolerance inconsistencies such as wrinkling. The illustrative examples bend and twist composite stiffeners (stringers) in full-tension to match the contoured shape of a panel, such as a wing skin panel, while mitigating wrinkle propagation.

The illustrative examples actively control 3-DOF (Degrees of Freedom) at designated intervals of the span of an entire pre-cure stringer, while the other 3-DOF are passively supported. The designated intervals have any desirable value. In some illustrative examples the designated intervals are every 2", every 3", every 6", every 12", every 18", or any other desirable interval.

In some illustrative examples, the base assembly is formed of a smooth continuous (or discontinuous) open-cell foam. The smooth continuous (or discontinuous) open-cell foam is used to hold vacuum at the base of the stringer. The L-shaped brackets apply both clamping force and outward air pressure to the composite stiffener. The combination of vacuum holding at the bottom and outward airflow at the top of the composite stiffener creates an air bearing surface for the stringer to be bent and twisted about the desired axis, which is at the centered base of the stringer. Outward airflow and compression of L-shaped brackets create an air bearing surface to eliminate shear friction on the stringer that can cause delamination and wrinkles.

Depending on whether the bend and twist are upward or downward for a given segment, the flow of vacuum and air may be reversed. The brackets may also remain locked in place once stringer position is achieved. In some illustrative examples, the brackets are then coupled to the pick and place system to be delivered to the wing panel.

The base assembly is designed to be of equivalent stiffness or lower stiffness than the stringer, which then holds the bending and twisting about the longitudinal axis. Controlling the stiffness of the base assembly allows for the stringer to be held in full-tension throughout forming regardless of upward or down bending.

The illustrative examples shift the longitudinal axis so that the composite stiffener is kept under tension by moving the longitudinal axis down to where the base assembly meets the composite stiffener. The base assembly takes on the bulk of the compression, while the composite stiffener is held in tension. Holding the composite stiffener in tension reduces or prevents wrinkle formation. In some illustrative examples, holding the composite stiffener in tension pulls/straightens out small wrinkles present in the composite stiffener.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A forming tool for forming a curvature into a composite stiffener, the forming tool comprising:
   a base assembly formed by a plurality of segments and a material for distributing a first airflow to a forming region created by the base assembly and an upper assembly, the first airflow capable of providing both an air bearing and a holding force to a first surface of a composite stiffener positioned in the forming region;
   the upper assembly comprising a plurality of brackets and material for distributing a second airflow to a second surface of the composite stiffener positioned in the forming region in an opposite direction to the first airflow, the second surface of the composite stiffener opposite the first surface of the composite stiffener; and
   actuators connected to the plurality of brackets and the plurality of segments, the actuators configured to move each of the plurality of segments relative to each other to change a curvature of the forming region along a length of the forming region.

2. The forming tool of claim 1, wherein the plurality of brackets comprises pairs of brackets, each pair individually moveable relative to a longitudinal axis of the forming region.

3. The forming tool of claim 2, wherein the actuators comprise a number of actuators connected to the plurality of brackets such that the number of actuators move each pair of the plurality of brackets independently relative to the remaining brackets of the plurality of brackets.

4. The forming tool of claim 3, wherein the actuators are connected to the plurality of brackets and the plurality of segments such that the actuators change the curvature of the forming region while maintaining a cross-section of the forming region.

5. The forming tool of claim 4 further comprising:
   a controller configured to send commands to at least one of the actuators to change the curvature of the forming region according to NC programming, air pressure sources to control at least one of the first airflow or the second airflow, actuated locks configured to selectively restrain the plurality of segments relative to compliant connectors, or actuated locks configured to selectively restrain the plurality of brackets relative to compliant connectors.

6. The forming tool of claim 1, wherein the material for distributing the second airflow is formed of a porous material to provide the second airflow to the forming region.

7. The forming tool of claim 1, wherein the material for distributing the second airflow includes at least one of perforations or channels to provide the second airflow to the forming region.

8. The forming tool of claim 1, wherein the material for distributing the first airflow is formed of a porous material to provide the first airflow to the forming region.

9. The forming tool of claim 1, wherein the material for distributing the first airflow of the base assembly includes at least one of perforations or channels to provide the first airflow to the forming region.

10. The forming tool of claim 1 further comprising:
    compliant connectors extending through and connecting the plurality of segments; and
    actuated locks configured to selectively restrain the plurality of segments relative to the compliant connectors.

11. The forming tool of claim 1 further comprising:
    compliant connectors extending through and connecting the plurality of brackets; and
    actuated locks configured to selectively restrain the plurality of brackets relative to the compliant connectors.

12. The forming tool of claim 1 further comprising:
    air pressure sources pneumatically connected to at least one of the material or the plurality of segments of the base assembly to provide the first airflow through the material; and
    air pressure sources pneumatically connected to at least one of the material or the plurality of brackets of the upper assembly to provide the second airflow through the material.

13. A forming tool comprising:
    a base assembly formed by a plurality of segments and a material for distributing a reversible first airflow to a forming region created by the base assembly and an upper assembly, the first airflow capable of providing both an air bearing and a holding force, the base assembly having a first stiffness;
    the upper assembly comprising a plurality of brackets and material for distributing a reversible second airflow to the forming region in an opposite direction to the first airflow, wherein the plurality of brackets comprises pairs of brackets, each pair individually moveable relative to a longitudinal axis of the forming region;

actuators connected to the plurality of brackets and the plurality of segments, the actuators configured to move each of the plurality of segments relative to each other to change a curvature of the forming region along a length of the forming region, wherein the actuators comprise a number of actuators connected to the plurality of brackets such that the number of actuators move each pair of the plurality of brackets independently relative to the remaining brackets of the plurality of brackets, wherein the actuators are connected to the plurality of brackets and the plurality of segments such that the actuators change the curvature of the forming region while maintaining a cross-section of the forming region;

a composite stiffener located in the forming region, the composite stiffener having a second stiffness that is greater than the first stiffness, wherein bending and twisting the composite stiffener holds the composite stiffener in tension and compression is present in the base assembly; and a controller configured to send commands to at least one of the actuators to change the curvature of the forming region according to NC programming, air pressure sources to control at least one of the first airflow or the second airflow, actuated locks configured to selectively restrain the plurality of segments relative to compliant connectors, and actuated locks configured to selectively restrain the plurality of brackets relative to compliant connectors.

14. The forming tool of claim 13, wherein the material for distributing the second airflow is formed of a porous material to provide the second airflow to the forming region.

15. The forming tool of claim 13, wherein the material for distributing the second airflow includes at least one of perforations or channels to provide the second airflow to the forming region.

16. The forming tool of claim 13, wherein the material for distributing the first airflow is formed of a porous material to provide the first airflow to the forming region.

17. The forming tool of claim 13, wherein the material for distributing the first airflow of the base assembly includes at least one of perforations or channels to provide the first airflow to the forming region.

18. The forming tool of claim 13 further comprising:
compliant connectors extending through and connecting the plurality of segments; and
actuated locks configured to selectively restrain the plurality of segments relative to the compliant connectors.

19. The forming tool of claim 13 further comprising:
compliant connectors extending through and connecting the plurality of brackets; and
actuated locks configured to selectively restrain the plurality of brackets relative to the compliant connectors.

20. The forming tool of claim 13 further comprising:
air pressure sources pneumatically connected to at least one of the material or the plurality of segments of the base assembly to provide the first airflow through the material; and
air pressure sources pneumatically connected to at least one of the material or the plurality of brackets of the upper assembly to provide the second airflow through the material.

* * * * *